(12) United States Patent
Nafarieh

(10) Patent No.: US 6,252,994 B1
(45) Date of Patent: Jun. 26, 2001

(54) ADAPTIVE QUANTIZATION COMPATIBLE WITH THE JPEG BASELINE SEQUENTIAL MODE

(75) Inventor: Asghar Nafarieh, Menlo Park, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/013,485

(22) Filed: Jan. 26, 1998

(51) Int. Cl.[7] .............................. C06K 9/36; C06K 9/38; C06K 9/46
(52) U.S. Cl. ......................... 382/253; 382/250; 382/239; 375/240.22
(58) Field of Search ................... 382/239, 251, 382/176, 164, 171, 244, 246, 248, 249, 250, 252, 254, 253, 168, 166; 348/405; 358/427, 261.1, 261.2, 261.3; 375/240.03, 240.2, 240.22

(56) References Cited

U.S. PATENT DOCUMENTS

| | | |
|---|---|---|
| 5,040,062 | 8/1991 | Knauer et al. . |
| 5,043,808 | 8/1991 | Knauer et al. . |
| 5,063,444 | 11/1991 | Knauer et al. . |
| 5,128,756 | 7/1992 | Johnston et al. . |
| 5,134,475 | 7/1992 | Johnston et al. . |
| 5,134,477 | 7/1992 | Knauer et al. . |
| 5,136,377 | 8/1992 | Johnston et al. . |
| 5,144,423 | 9/1992 | Knauer et al. . |
| 5,157,488 | * 10/1992 | Pennebaker ..................... 348/405 |
| 5,274,715 | 12/1993 | Hsu . |
| 5,305,102 | 4/1994 | Knaur et al. . |
| 5,309,526 | 5/1994 | Pappas et al. . |
| 5,321,522 | 6/1994 | Eschbach . |
| 5,331,348 | 7/1994 | Knauer et al. . |
| 5,333,212 | 7/1994 | Ligtenberg . |
| 5,426,512 | 6/1995 | Watson . |
| 5,517,581 | 5/1996 | Johnston et al. . |
| 5,559,900 | 9/1996 | Jayant et al. . |
| 5,629,780 | 5/1997 | Watson . |
| 5,661,525 | 8/1997 | Kovacevic et al. . |
| 5,682,442 | 10/1997 | Johnston et al. . |
| 5,719,961 | * 2/1998 | Normile et al. ..................... 382/239 |
| 5,742,704 | * 4/1998 | Suzuki et al. ..................... 382/176 |

OTHER PUBLICATIONS

Crouse et al. "Joint thresholding and quantizer selection for decoder–compatible baseline JPEG". International Conference on Acoustics, Speech, and Signal Processing, 1995, v. 4. pp. 2331–2334, May, 1995.*

(List continued on next page.)

Primary Examiner—Bhavesh Mehta
(74) Attorney, Agent, or Firm—Oliff & Berridge, PLC

(57) ABSTRACT

Pixel blocks of an input image are type classified based on an analysis of pixel values for each respective pixel block. A discrete cosine transform (DCT) is performed on the pixel values of each pixel block, and a quantization modification process thresholds and/or quantizes the resulting DCT coefficients based on the type classification of the respective pixel block. Once the coefficients are modified in this way and encoded, the resulting data can be decoded and dequantized in compliance with the standard JPEG sequential mode data syntax in order to construct a perceptually faithful representation of the image, without passing any additional information to the decoder concerning the quantization modification.

16 Claims, 19 Drawing Sheets

OTHER PUBLICATIONS

Crouse et al. "Joint thresholding and quantizer for transform image coding: entropy constrained analysis and applications to baseline JPEG". IEEE Transactions on Image Processing, v. 6, Issue 2. pp. 285–297, Feb. 1997.*

Ricardo L. de Queiroz, Xerox Corporation, "Processing JPEG–Compressed Images and Documents," Dec. 4, 1996.

Ricardo L. de Queiroz, Xerox Corporation , "Processing JPEG–Compressed Images," Proc. of IEEE Intl. Conf. On Image Processing, ICIP, Santa Barbara, CA, Oct. 1997.

F. Keissarian, M.K. Ibrahim and M.F. Daemi, "Adaptive Coding of Images Based on the Visual Activity Level," SPIE vol. 2298, Jul. 1994, San Diego, CA. pp. 25–31.

S.J.P. Westen, R.L. Lagendijk, and J. Biemond, "Perceptual Optimization of Image Coding Algorithms," Proc. of Intl. Conf. on Image Processing, Washington, D.C., 1995.

Ruth Rosenholtz and Andrew B. Watson, "Perceptual adaptive JPEG coding," Proc. of Intl. Conf. on Image Processing, Lausanne, Switzerland, 1996.

Trac D. Tran and Robert Safranek, "A Locally Adaptive Perceptual Masking Threshold Model for Image Coding," Proc. of Intl. Conf. on Acoustics Speech and Signal Processing, Atlanta, GA 1996.

Andrew B. Watson, Gloria Y. Yang, Joshua A. Solomon and John Villasenor, "Visual Thresholds for Wavelet Quantization Error," SPIE Proceedings Vol. 2657, paper #44, Human Vision and Electronic Imaging, B. Rogowitz and J. Allebach, Ed., The Society for Imaging Science and Technology, (1996).

Marcia G. Ramos and Sheila S. Hemami, "Edge–adaptive JPEG image compression, " SPIE 1996 Symposium on Visual Communications & Image Processing.

Marcia G. Ramos, Sheila S. Hemami, Michael A. Tamburro, "Psychovisually–Based Multiresolution Image Segmentation," Proc. of IEEE Intl. Conf. on Image Processing, Santa Barbara, CA, Oct. 1997.

Marcia G. Ramos, Sheila S. Hemami, "Activity–Selective JPEG Coding," Cornell University, Ithaca, NY, Jun. 1997.

Robert J. Safranek, "A Comparison of the Coding Efficiency of Perceptual Models," SPIE vol. 2411, Feb. 1995, pp. 83–91.

Kannan Ramehandran and Martin Vetterli, "Rate–Distortion Optimal Fast Threshold with Complete JPEG/MPEG Decoder Compatibility," IEEE Transactions on Image Processing, vol. 3, No. 5, Sep. 1994, pp. 700–704.

Classified Vector Quantization of Images, Bhaskar Ramamurthi & Allen Gersho, IEEE Transactions on Communications, vol. Com–34, No. 11, Nov. 1986.

* cited by examiner

Quantization Table optimized for text images

| 10 | 10 | 10 | 10 | 10 | 10 | 10 | 16 |
|----|----|----|----|----|----|----|----|
| 10 | 10 | 10 | 10 | 10 | 10 | 16 | 16 |
| 10 | 10 | 10 | 10 | 10 | 16 | 16 | 16 |
| 10 | 10 | 10 | 10 | 16 | 16 | 16 | 16 |
| 10 | 10 | 10 | 16 | 16 | 16 | 16 | 16 |
| 10 | 10 | 16 | 16 | 16 | 16 | 16 | 16 |
| 10 | 16 | 16 | 16 | 16 | 16 | 16 | 16 |
| 16 | 16 | 16 | 16 | 16 | 16 | 16 | 16 |

*FIG. 14a*

Quantization Table optimized for pictorial images

| 10 | 11 | 12 | 13 | 16  | 23  | 36  | 59  |
|----|----|----|----|-----|-----|-----|-----|
| 11 | 12 | 13 | 14 | 19  | 29  | 45  | 66  |
| 12 | 12 | 13 | 17 | 25  | 39  | 53  | 78  |
| 13 | 14 | 17 | 24 | 36  | 48  | 66  | 98  |
| 16 | 19 | 25 | 36 | 46  | 61  | 87  | 129 |
| 23 | 29 | 39 | 48 | 61  | 84  | 120 | 178 |
| 36 | 45 | 53 | 66 | 87  | 120 | 171 | 255 |
| 59 | 66 | 78 | 98 | 129 | 178 | 255 | 255 |

*FIG. 14b*

Quantization Table optimized for detailed images

| 10  | 11  | 15  | 33  | 77  | 176 | 235 | 255 |
|-----|-----|-----|-----|-----|-----|-----|-----|
| 11  | 13  | 25  | 55  | 125 | 235 | 255 | 255 |
| 15  | 25  | 49  | 105 | 194 | 255 | 255 | 255 |
| 33  | 55  | 105 | 180 | 255 | 255 | 255 | 255 |
| 77  | 125 | 194 | 255 | 255 | 255 | 255 | 255 |
| 176 | 235 | 255 | 255 | 255 | 255 | 255 | 255 |
| 235 | 255 | 255 | 255 | 255 | 255 | 255 | 255 |
| 255 | 255 | 255 | 255 | 255 | 255 | 255 | 255 |

*FIG. 14c* detailed (halftone)

| Raw Data | | | | | | | |
|---|---|---|---|---|---|---|---|
| 38 | 20 | 18 | 24 | 44 | 98 | 110 | 70 |
| 76 | 26 | 67 | 28 | 38 | 94 | 102 | 64 |
| 40 | 33 | 88 | 77 | 56 | 83 | 100 | 55 |
| 23 | 33 | 55 | 117 | 58 | 58 | 73 | 42 |
| 42 | 62 | 73 | 65 | 29 | 43 | 60 | 50 |
| 66 | 120 | 99 | 50 | 28 | 70 | 106 | 72 |
| 36 | 56 | 41 | 78 | 83 | 122 | 122 | 68 |
| 113 | 91 | 70 | 145 | 213 | 74 | 24 | 27 |

FIG. 15a

| DCT Data (S) | | | | | | | |
|---|---|---|---|---|---|---|---|
| -486 | -52 | -42 | 26 | -35 | 44 | -15 | -1 |
| -81 | -70 | 61 | -2 | -42 | 48 | 40 | 4 |
| 45 | -17 | -17 | 82 | 39 | -32 | 0 | 21 |
| -35 | -31 | 94 | -14 | -70 | -2 | -1 | -15 |
| -23 | 32 | -55 | 5 | 69 | -19 | -19 | -5 |
| -11 | -71 | -18 | 6 | -15 | 19 | -19 | -27 |
| 27 | 37 | -2 | -18 | -2 | -16 | -9 | 12 |
| -18 | -27 | -3 | 3 | -7 | 2 | 7 | 1 |

FIG. 15b

| Q* - table (detailed) | | | | | | | |
|---|---|---|---|---|---|---|---|
| 10 | 11 | 15 | 33 | 77 | 176 | 235 | 255 |
| 11 | 13 | 25 | 55 | 125 | 235 | 255 | 255 |
| 15 | 25 | 49 | 105 | 194 | 255 | 255 | 255 |
| 33 | 55 | 105 | 180 | 255 | 255 | 255 | 255 |
| 77 | 125 | 194 | 255 | 255 | 255 | 255 | 255 |
| 176 | 235 | 255 | 255 | 255 | 255 | 255 | 255 |
| 235 | 255 | 255 | 255 | 255 | 255 | 255 | 255 |
| 255 | 255 | 255 | 255 | 255 | 255 | 255 | 255 |

FIG. 15c

| Thresholded DCT (S*) | | | | | | | |
|---|---|---|---|---|---|---|---|
| -486 | -52 | -42 | 0 | 0 | 0 | 0 | 0 |
| -81 | -70 | 61 | 0 | 0 | 0 | 0 | 0 |
| 45 | 0 | 0 | 0 | 0 | 0 | 0 | 0 |
| -35 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 15d

| Quantized DCT (Sq*) - Using Text Qtable | | | | | | | |
|---|---|---|---|---|---|---|---|
| -48 | -5 | -4 | 0 | 0 | 0 | 0 | 0 |
| -8 | -7 | 6 | 0 | 0 | 0 | 0 | 0 |
| 4 | 0 | 0 | 0 | 0 | 0 | 0 | 0 |
| -3 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 15e

Pictorial

| Raw Data | | | | | | | |
|---|---|---|---|---|---|---|---|
| 50 | 21 | 11 | 19 | 153 | 79 | 11 | 9 |
| 23 | 10 | 11 | 33 | 117 | 43 | 13 | 10 |
| 34 | 38 | 39 | 44 | 63 | 27 | 22 | 60 |
| 41 | 61 | 53 | 40 | 60 | 40 | 35 | 167 |
| 20 | 23 | 24 | 32 | 110 | 65 | 42 | 101 |
| 15 | 33 | 21 | 18 | 162 | 64 | 60 | 41 |
| 28 | 100 | 51 | 13 | 30 | 86 | 84 | 22 |
| 144 | 170 | 75 | 25 | 23 | 131 | 38 | 10 |

FIG. 16a

| DCT Data (S) | | | | | | | |
|---|---|---|---|---|---|---|---|
| -612 | -31 | -31 | 77 | 17 | -114 | -2 | 32 |
| -74 | -45 | -65 | -7 | 107 | -9 | 7 | 43 |
| 4 | 106 | -20 | 99 | -71 | 13 | -1 | -20 |
| -26 | -73 | -82 | 55 | 32 | -25 | -24 | 63 |
| 58 | 18 | 47 | 1 | 14 | -22 | 38 | -28 |
| 10 | -15 | 36 | -40 | -24 | 3 | -2 | -10 |
| 15 | 22 | -17 | 26 | 19 | -11 | 0 | 16 |
| -21 | 2 | -2 | 0 | -21 | 20 | 1 | -12 |

FIG. 16b

| Q* - table (pictorial) | | | | | | | |
|---|---|---|---|---|---|---|---|
| 10 | 11 | 12 | 13 | 16 | 23 | 36 | 59 |
| 11 | 12 | 13 | 14 | 19 | 29 | 45 | 66 |
| 12 | 12 | 13 | 17 | 25 | 39 | 53 | 78 |
| 13 | 14 | 17 | 24 | 36 | 48 | 66 | 98 |
| 16 | 19 | 25 | 36 | 46 | 61 | 87 | 129 |
| 23 | 29 | 39 | 48 | 61 | 84 | 120 | 178 |
| 36 | 45 | 53 | 66 | 87 | 120 | 171 | 255 |
| 59 | 66 | 78 | 98 | 29 | 178 | 255 | 255 |

FIG. 16c

| Thresholded DCT (S*) | | | | | | | |
|---|---|---|---|---|---|---|---|
| -612 | -31 | -31 | 77 | 17 | -114 | 0 | 0 |
| -74 | -45 | -65 | 0 | 107 | 0 | 0 | 0 |
| 0 | 106 | -20 | 99 | -71 | 0 | 0 | 0 |
| -26 | -73 | -82 | 55 | 0 | 0 | 0 | 0 |
| 58 | 0 | 47 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 16d

| Quantized DCT (Sq*) - Using Text Qtable | | | | | | | |
|---|---|---|---|---|---|---|---|
| -61 | -3 | -3 | 8 | 2 | -11 | 0 | 0 |
| -7 | -4 | -6 | 0 | 11 | 0 | 0 | 0 |
| 0 | 11 | -2 | 10 | -7 | 0 | 0 | 0 |
| -3 | -7 | -8 | 5 | 0 | 0 | 0 | 0 |
| 6 | 0 | 5 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

*FIG. 16e*

Text

| Raw Data | | | | | | | |
|---|---|---|---|---|---|---|---|
| 255 | 254 | 253 | 254 | 254 | 254 | 254 | 254 |
| 252 | 253 | 253 | 254 | 253 | 253 | 252 | 253 |
| 254 | 254 | 253 | 253 | 254 | 254 | 254 | 250 |
| 251 | 252 | 251 | 253 | 254 | 254 | 252 | 247 |
| 251 | 253 | 249 | 253 | 247 | 241 | 215 | 179 |
| 247 | 246 | 247 | 225 | 78 | 71 | 33 | 12 |
| 249 | 246 | 248 | 119 | 23 | 24 | 15 | 14 |
| 253 | 251 | 250 | 217 | 111 | 57 | 9 | 3 |

*FIG. 17a*

| DCT Data (S) | | | | | | | |
|---|---|---|---|---|---|---|---|
| 630 | 316 | -21 | -46 | -22 | 25 | 14 | -17 |
| 402 | -337 | 9 | 60 | 20 | -24 | -18 | 15 |
| -133 | 110 | 15 | -34 | 2 | -1 | 9 | 2 |
| -71 | 53 | 1 | -8 | -14 | 16 | 4 | -12 |
| 117 | -74 | -38 | 32 | 19 | -12 | -12 | 4 |
| -53 | 11 | 55 | -19 | -19 | -2 | 11 | 11 |
| -12 | 38 | -38 | -6 | 18 | 14 | -7 | -20 |
| 29 | -34 | 15 | 18 | -13 | -11 | 2 | 16 |

*FIG. 17b*

| Thresholded DCT (S*) | | | | | | | |
|---|---|---|---|---|---|---|---|
| 630 | 316 | -21 | -46 | -22 | 25 | 14 | -17 |
| 402 | -337 | 0 | 60 | 20 | -24 | -18 | 0 |
| -133 | 110 | 15 | -34 | 0 | 0 | 0 | 0 |
| -71 | 53 | 0 | 0 | 0 | 16 | 0 | 0 |
| 117 | -74 | -38 | 32 | 19 | 0 | 0 | 0 |
| -53 | 11 | 55 | -19 | -19 | 0 | 0 | 0 |
| -12 | 38 | -38 | 0 | 18 | 0 | 0 | -20 |
| 29 | -34 | 0 | 18 | 0 | 0 | 0 | 16 |

FIG. 17c

| Quantized DCT (Sq*) - Using Text Qtable | | | | | | | |
|---|---|---|---|---|---|---|---|
| 63 | 31 | -2 | -5 | -2 | 2 | 1 | -1 |
| 40 | -34 | 0 | 6 | 2 | -2 | -1 | 0 |
| -13 | 11 | 1 | -3 | 0 | 0 | 0 | 0 |
| -7 | 5 | 0 | 0 | 0 | 1 | 0 | 0 |
| 12 | -7 | -4 | 2 | 1 | 0 | 0 | 0 |
| -5 | 1 | 3 | -1 | -1 | 0 | 0 | 0 |
| -1 | 2 | -2 | 0 | 1 | 0 | 0 | -1 |
| 2 | -2 | 0 | 1 | 0 | 0 | 0 | 1 |

FIG. 17d

| Quantized DCT (Sq*) - Using Text Qtable | | | | | | | |
|---|---|---|---|---|---|---|---|
| 63 | 31 | -2 | -5 | -2 | 2 | 1 | -1 |
| 40 | -34 | 1 | 6 | 2 | -2 | -1 | 1 |
| -13 | 11 | 1 | -3 | 0 | 0 | 1 | 0 |
| -7 | 5 | 0 | -1 | -1 | 1 | 0 | -1 |
| 12 | -7 | -4 | 2 | 1 | -1 | -1 | 0 |
| -5 | 1 | 3 | -1 | -1 | 0 | 1 | 1 |
| -1 | 2 | -2 | 0 | 1 | 1 | 0 | -1 |
| 2 | -2 | 1 | 1 | -1 | -1 | 0 | 1 |

FIG. 17e

ADAPTIVE QUANTIZATION COMPATIBLE WITH THE JPEG BASELINE SEQUENTIAL MODE

BACKGROUND OF THE INVENTION

1. Field of Invention

This invention relates to digital systems for scanning, representing, and reproducing document images. More specifically, the present invention is directed to adaptive quantization within the JPEG sequential mode data syntax. In particular, it relates to a method of segmenting an image into blocks of different image types that can be used to compress the image more efficiently without loss of significant information based on the visual properties of the human eye.

2. Description of Related Art

The JPEG (Joint Photographic Expert Group) architecture can be viewed as a compression method from which various applications can define a compression system that is suitable for their particular needs. JPEG is concerned only with the encoding and decoding of image data—the interpretation of the data is beyond the scope of JPEG and is left to the applications that use it.

The JPEG specification consists of several parts, including protocols for both lossless and lossy compression encoding. The lossless compression algorithm uses a predictive/adaptive model with a Huffman code output stage without the loss of any information. The JPEG lossy compression algorithms, including the standard sequential mode with which this invention is most concerned, operate in several successive stages, as shown in FIG. 1. These steps combine to form a compressor capable of compressing predominantly continuous tone images while losing little of their original fidelity. In general in this application, for simplicity the term "JPEG" used as an adjective will usually refer to JPEG sequential mode data syntax. For example, "JPEG compliant" means "compliant with the JPEG sequential mode data syntax."

Central to the compression process is the Discrete Cosine Transform (DCT) performed on each image plane (e.g., color or luminosity values) of an image. As will be appreciated, there are mono-plane images (e.g., gray images), as well as multi-layer or multi-plane images (e.g., rgb or cmyk images). Therefore, it is to be understood that "image" sometimes is used herein to refer to a single plane of a multi-layer image because essentially the same compression process is performed for each image plane. For example, when a DCT is performed on the 64 values of an 8×8 pixel block within any plane of an image, the result is a set of 64 coefficients, representing amplitudes of 64 respective orthogonal waveform components, that together define the values for all 64 pixels in the 8×8 pixel block. An inverse DCT performed on the 64 coefficients will reproduce the original 64 values of the 8×8 pixel block.

The advantage of using these 64 coefficients instead of the 64 original values is that each coefficient represents the magnitude of an orthogonal waveform representing a different spatial frequency. Smooth textured blocks have low pixel-to-pixel variation, so many zero-value "high-frequency" DCT coefficients are likely. For example, performing a DCT on a block of 64 pixels having identical values will result in one nonzero coefficient and 63 zero value coefficients. Further, if the coefficients are ordered by spatial frequency, longer strings of zero-value coefficients will result.

As one skilled in the art will understand, data with long zero-value strings will enable greater data compression, for example when using Huffman-type entropy encoding. For this reason, when a DCT is computed for a (usually 8×8) pixel block, it is desirable to represent the coefficient for high spatial frequencies with less precision. This is done by a process called quantization, illustrated in FIG. 2. Quantization is basically a process for reducing the precision of the DCT coefficients. Precision reduction is extremely important, since lower precision almost always implies greater throughput in the compressed data stream. One reason the JPEG algorithm compresses so effectively is that a large number of coefficients in the DCT block are rounded or truncated to zero value during the quantization stage.

A DCT coefficient is quantized by dividing it by a nonzero positive integer called a quantization value, and truncating or rounding the quotient—the quantized DCT coefficient—to the nearest integer. In order to reconstruct (dequantize) the DCT coefficient, the decoder must multiply it by the quantization value. Since some precision is lost in quantizing, the reconstructed DCT coefficients are approximations of the values before quantization.

Before quantizing, the DCT coefficients are ordered into a one-dimensional vector using the well known zigzag scan sequence as shown in Table 1 below. The lowest frequency component, represented by the coefficient labeled zero, is the DC component. The remaining coefficients are the AC coefficients, and are ordered horizontally and vertically from left to right and top to bottom, respectively, representing increasingly high frequencies. The DC coefficient is coded using a one-dimensional DPCM (Differential Pulse Code Modulation) technique, which converts the current DC coefficient to a difference from the DC coefficient of the previous block, followed by entropy coding. The AC coefficients in the zigzag scan are divided into runs of zero coefficients terminated by nonzero coefficients. Huffman codes are then assigned to each possible combination of zero coefficient run length and magnitude for the next non-zero AC coefficient.

TABLE 1

Zigzag scan index sequence for DCT coefficients

| 0, | 1, | 5, | 6, | 14, | 15, | 27, | 28, |
|---|---|---|---|---|---|---|---|
| 2, | 4, | 7, | 13, | 16, | 26, | 29, | 42, |
| 3, | 8, | 12, | 17, | 25, | 30, | 41, | 43, |
| 9, | 11, | 18, | 24, | 31, | 40, | 44, | 53, |
| 10, | 19, | 23, | 32, | 39, | 45, | 52, | 54, |
| 20, | 22, | 33, | 38, | 46, | 51, | 55, | 60, |
| 21, | 34, | 37, | 47, | 50, | 56, | 59, | 61, |
| 35, | 36, | 48, | 49, | 57, | 58, | 62, | 63. |

For compressing an image plane of an image, JPEG protocol allows the encoder to embed an 8×8 quantization table (Q-table) in the data that will be passed to the decoder. This Q-table can contain different values for quantizing the respective DCT coefficients, chosen so as to minimize perceived distortion in reconstructed images, using principles based on the human visual system. The lowest level of capability for the JPEG sequential mode is the "baseline system." In this system, which is intended to allow a very simple implementation in hardware, no more than one table for each image plane (up to a maximum total of four, regardless of the total number of image planes) can be embedded in the data to be passed to the decoder.

In a typical JPEG baseline sequential technique, illustrated in FIGS. 1–3, source image pixel values of an 8×8 pixel block ($p_{00}$, $p_{01}$, ..., $p_{xy}$, ..., $p_{77}$) 102 are subjected to a discrete cosine transform (DCT) 104F. The resulting DCT coefficients are ordered into a DCT coefficient matrix $(S_{00}, S_{01}, \ldots, S_{xy}, \ldots, S_{77})$ 104 as shown in Table 1 above. Quantization 108F is performed on the DCT coefficients 104, using a Q-table $(Q_{00}, Q_{01}, \ldots, Q_{xy}, \ldots, Q_{77})$ 106 to obtain quantized DCT coefficients $(Sq_{00}, Sq_{01}, \ldots, Sq_{xy}, \ldots, Sq_{77})$ 108, by dividing each $S_{xy}$ by its corresponding $Q_{xy}$ and rounding the result to the nearest integer. The quantized DCT coefficients 108 are then encoded by an entropy encoder 110 using Huffman tables 112, and the resulting encoded (compressed) data 114 are transmitted or stored until needed, at which time they are decoded, dequantized, and subjected to an inverse DCT to reconstruct the 8×8 pixel block 102 (or an approximation thereof).

Steps for performing JPEG compliant compression are summarized in FIG. 3. In step S302, an image is scanned and pixels are organized into 8×8 pixel blocks. At step S304, a discrete cosine transform (DCT) is performed on a block. At step S306, the DCT coefficients are quantized and at step S308, encoding of the pixel block is performed. This process is repeated for all blocks in the image, until JPEG encoding has been performed for the entire image.

JPEG was originally adopted for encoding photographs that typically contain smooth changes from one pixel to the next, but it also can be used for other image types, such as text, which are characterized by sharp pixel-to-pixel variations. However, coarser quantization (i.e., larger quantization values) can be used to improve compression of images characterized by smooth pixel variations, without unduly degrading perceptual image quality, while more fine quantization is required for text. Accordingly, the optimum Q-table for quantization, affording an acceptable balance between image quality and compression, is different for different types of images.

The optimum Q-table varies with image type because an image with very sharp pixel value transitions (e.g., a text image) is much less perceptually forgiving of any reduction in precision. For example, if a coarse quantization Q-table optimal for pictorial images types is used to compress a text image, when decompressed the image is much more likely to include artifacts noticeable to the human eye. Other image types having smoother pixel value transitions, or very detailed images (e.g., a photo of a field of grass) can undergo greater compression (with a corresponding greater loss of precision) without producing artifacts noticeable to the human eye.

Because an optimum Q-table is different for different types of images (text, half-tone, pictorial, etc.), it is possible to choose different Q-tables to be passed to the decoder depending on the type of image being compressed, although in many applications (such as with copiers or printers) this option is undesirable because of the added expense required to implement it. As a result, for example, most copiers are equipped to always use a text-optimized Q-table to ensure the minimum of undesirable artifacts discernible to the human eye in the resulting copy, regardless of the image type of the document being copied. However, it is possible to equip a copier with an "image type" selection feature by which the user can manually select the type of image being copied. This, of course, assumes that the user will always be correct in judging the actual image type of the document. Alternatively, a copier or other image compressing apparatus may include means to automatically determine the image type of each document being copied, and choose an optimal Q-table accordingly.

However, a practical complication arises when a document is composed of different image types. Typical documents may contain a mixture of textual (i.e., sharp edge) and pictorial regions on the same page. For example, a document may contain a photograph with a section of explanatory text beneath it. When a document comprises a number of different image types, and a single Q-table must be chosen for all of these image types, a text-optimized Q-table should be chosen so that high perceptual quality is achieved for the entire image.

Accordingly, it would be advantageous to be able to use image-type optimized Q-tables to quantize the DCT coefficients for image-type characterized blocks. One way to achieve this would be to quantize each block using different Q-table based on its image type and pass the table to the decoder, so that each block can be reconstructed with minimum perceptual error. Such a system must also include a nonstandard decoder that can receive information from the encoder about the quantization table used for each block. Unfortunately, current JPEG compliant decoders cannot do this because, as explained above, baseline JPEG protocol allows only one Q-table per image plane (up to a maximum of four per image), to be passed to the decoder. Thus, using the current sequential JPEG algorithm on a mixed image type document represents a poor compromise between the size of the compressed image and the quality of the image that can be reproduced from it.

Adaptive quantization, if successfully implemented, could significantly improve the image quality achieved at a given rate. With adaptive quantization, a value is passed to the decoder that will cause the decoder to modify the Q-table it is using to dequantize the decoded data. Recently, the JPEG committee passed recommendation T.84 that allows a single scaling factor to be passed to the decoder, by which the decoder will linearly scale all the values in the Q-table. There has not been much effort by the industry to implement this method, because it is generally understood that not much improvement in compression can be achieved using a single scaling factor without unduly degrading image quality. This is because linear scaling equally affects both the high frequency and the low frequency coefficients. However, since perceptual image quality is less affected by changes to high frequency coefficients than to low frequency coefficients, significant improvement in compression without unduly degrading perceptual quality can only be achieved by increasing quantization factors for high frequency coefficients more than for low frequency coefficients.

SUMMARY OF THE INVENTION

In contrast, the system and method of the present invention allow the encoder to in effect use as many image type optimized quantization tables as needed to encode the image based on the different image types of different pixel blocks within the image, where the selection of the appropriate quantization table is governed by an analysis of either the DCT coefficients or of the spatial domain pixel value variations in the pixel blocks themselves. However, the number of tables that are sent to the decoder is compliant with the JPEG "baseline" model, so standard JPEG decoders can be used to reconstruct the image.

In accordance with one of the more detailed aspects of this invention, 8×8 blocks of pixel values are first analyzed, using either the raw data in the spatial domain or a discrete cosine transform (DCT) representation of the pixel values of each such block, to classify the respective blocks as being one or another of a plurality of different predefined image types. The DCT values for each of these image-type characterized pixel blocks are then non-linearly thresholded or otherwise modified in accordance with a set of factors that are optimized for images of the type represented by the respective pixel block, thereby providing a modified set of DCT values. This modified set of DCT values, in turn, is quantized in accordance with a quantization table that is optimized for text-type images. This table, together with the quantized DCT values, then is sent to the decoder in compliance with the standard JPEG sequential mode data syntax. This process may be further enhanced by bypassing the pre-quantization thresholding/modification of the DCT values during the processing of text-type image blocks.

A text optimized quantization table is an example of what is referred to herein as a "fine" quantization table. More generally, however, a fine quantization table refers to a table that is composed of relatively low quantization factors.

BRIEF DESCRIPTION OF THE DRAWINGS

FIG. 8b illustrates a row texture calculation algorithm used in the process of FIG. 8a;

FIG. 8c illustrates a column texture calculation algorithm used in the process of FIG. 8a;

FIG. 14a shows a text-optimized quantization table sent to the JPEG decoder in an embodiment of the invention;

FIG. 14b shows a quantization modification table for pictorial-type image blocks used in an embodiment of the invention;

FIG. 14c shows a quantization modification table for detailed-type image blocks used in an embodiment of the invention;

FIG. 15a shows a sample detailed-type 8×8 pixel block of an image;

FIG. 15b shows DCT coefficients derived from the pixel block of FIG. 15a;

FIG. 15c shows the quantization table of FIG. 14c used as a quantization modification table in an embodiment of the invention for detailed-type image blocks;

FIG. 15d shows thresholded DCT coefficients resulting when the quantization table of FIG. 14c is used to threshold the DCT coefficients of FIG. 15b;

FIG. 15e shows quantized DCT coefficients resulting when the quantization table of FIG. 14a is used to quantize the thresholded DCT coefficients of FIG. 15d;

FIG. 16a shows a sample pictorial-type 8×8 pixel block of an image;

FIG. 16b shows DCT coefficients derived from the pixel block of FIG. 16a;

FIG. 16c shows the quantization table of FIG. 14b used as a quantization modification table in an embodiment of the invention for pictorial-type image blocks;

FIG. 16d shows thresholded DCT coefficients resulting when the quantization table of FIG. 14b is used to threshold the DCT coefficients of FIG. 16b;

FIG. 16e shows quantized DCT coefficients resulting when the quantization table of FIG. 14a is used to quantize the thresholded DCT coefficients of FIG. 16d;

FIG. 17a shows a sample text-type 8×8 pixel block of an image;

FIG. 17b shows DCT coefficients derived from the pixel block of FIG. 17a;

FIG. 17c shows thresholded DCT coefficients resulting when the quantization table of FIG. 14a is used as a quantization modification table to threshold the DCT coefficients of FIG. 17b;

FIG. 17d shows quantized DCT coefficients resulting when the quantization table of FIG. 14a is used to quantize the thresholded DCT coefficients of FIG. 17c;

FIG. 17e shows quantized DCT coefficients resulting when the quantization table of FIG. 14a is used to quantize the non-thresholded DCT coefficients of FIG. 17b.

DETAILED DESCRIPTION OF PREFERRED EMBODIMENTS

This apparatus and method disclosed below are suitable for use in real-time digital document systems where both implementation cost and image quality are important, and provide for incorporating segmentation and adaptive quantization procedures within the standard JPEG compressed data syntax for baseline sequential DCT coding. A standard sequential JPEG decoder can be used to decode the compressed data generated using the invention, so that the adaptive quantization does not have to be embedded in the decoding operation.

The embodiments of the invention disclosed below provide a low cost system for encoding images compactly into a standard format while substantially retaining the visual quality of the original image, and are applicable in any digital imaging system for storage or transmission. The invention can reduce storage cost and decrease transmission time for image processing devices including digital copiers, multifunction machines, color fax, internet fax, document storage, and scanning systems.

To accomplish the above, a method is disclosed herein for segmenting an image into blocks of different image types based on the texture or "busyness" of the pixel blocks. A method is also disclosed for segmenting an image into blocks of different image types based on features generated from DCT coefficients. These segmentation methods can also be used to improve the quality of image reproduction in printers, copiers, and the like by using a different and more suitable rendering method for each image type. As described below, either segmentation method can be considered for adaptive quantization of DCT coefficients tailored to the JPEG baseline sequential decoder, depending on the requirements of the particular application.

Figure 4:
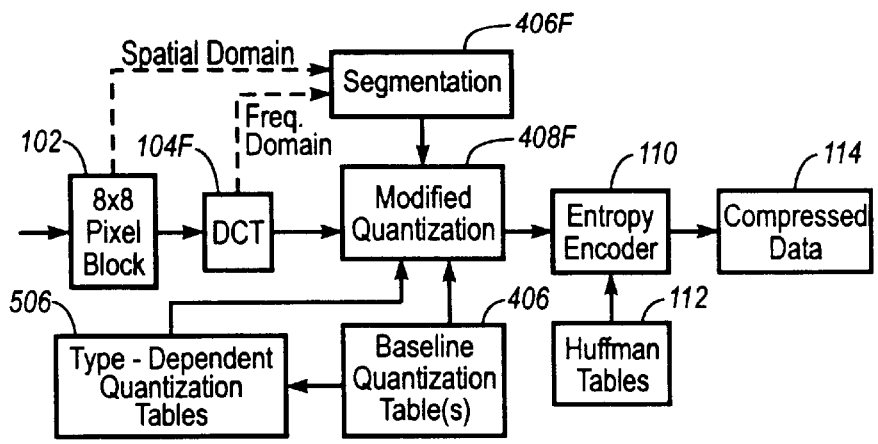
FIG. 4 is a functional chart for segmentation and adaptive quantization techniques according to an embodiment of the invention.
Figure 5:
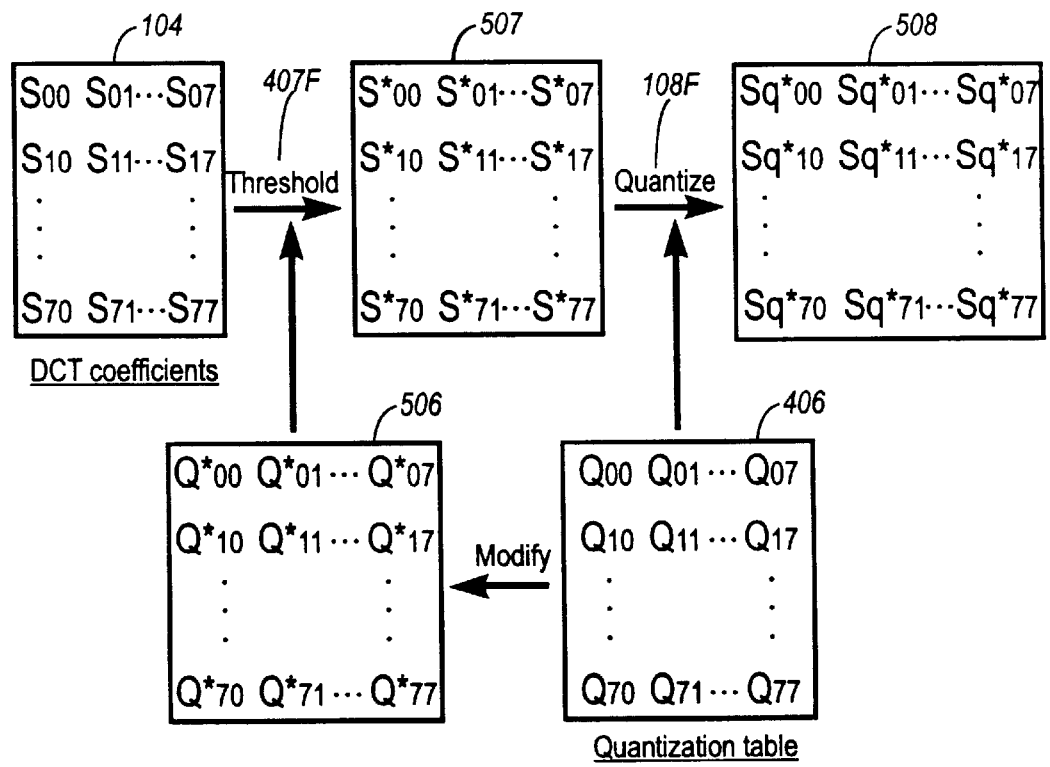
FIG. 5 illustrates a quantization process according to an embodiment of the invention.

FIGS. 4 and 5 illustrate JPEG baseline sequential mode compliant compression schemes incorporating the segmentation and adaptive quantization techniques of the present invention. The segmentation and quantization modification functions, combined with the standard JPEG encoder, form a powerful compressor capable of compressing documents containing a mixture of textual and pictorial materials into high quality and high compression JPEG streams or files, as described below. As will be recalled, this disclosure has been simplified by focusing on one plane of an image, with the understanding that essentially the same description applies to each of the planes of multi-layer images.

With reference to FIGS. 4 and 5, JPEG compression according to the invention includes subjecting a pixel block 102 to conventional DCT processing 104F to obtain DCT coefficients ($S_{00}$, $S_{01}$, ..., $S_{xy}$, ..., $S_{77}$) 104, and then performing segmentation 406F using either spatial domain segmentation techniques applied to the pixel block 102, or frequency domain segmentation techniques applied to the DCT coefficients 104, as described below. The DCT coefficients 104 then undergo modified quantization 408F, which in this embodiment comprises performing thresholding 407F of the DCT coefficients 104 according to an image type dependent quantization modification table (Q*-table) 506 chosen or modified according to the result of the segmentation procedure 406F, and quantizing 108F the thresholded DCT coefficients ($S^*_{00}$, $S^*_{01}$, ..., $S^*_{xy}$, ..., $S^*_{77}$) 507 using a single quantization table (Q-table) 406 (which is the embodiments described below is a text-optimized Q-table) that will be passed to the JPEG decoder. The modified quantized DCT coefficients ($Sq^*_{00}$, $Sq^*_{01}$, ..., $Sq^*_{xy}$, ..., $Sq^*_{77}$) 508 are then encoded by the entropy encoder 110 using Huffman tables 112 in a conventional fashion, and the resulting encoded, compressed data 114 are transmitted or stored until needed.

Segmentation is performed in either the frequency domain or the spatial domain. The segmentation function 406F classifies each 8×8 pixel block by image type category, such as "lineart" (e.g., text) or "detailed" (e.g., halftone). Segmentation in the spatial domain is more accurate but more computational than segmentation in the frequency domain, which is based on features obtained from the DCT coefficients. Segmentation in the spatial domain will be described first below, and segmentation in the frequency domain will be described thereafter. The following methods (rules) for segmenting an image are for particular embodiments of the invention. Other variations will be readily understood and are within the scope of the invention.

Segmentation of image pixel blocks by image type can be achieved by classifying each image pixel block by its texture (pixel value variation in the spatial domain). This method identifies the "busyness" of each 8×8 pixel block, is reliable over a very wide class of images, and is simple enough that most of it can be implemented in hardware to provide real time segmentation at low cost.

The task of the segmenter is to classify pixel blocks by image type. A tag identifying or describing the image type can be either a label representing the classification or describing the block by name, such as "lineart" or "detailed," or a value or set of features that describe the busyness of the block. The latter is more accurate than the former, since a block could contain portions of more than one image type. By using a set of images for which the tag values are known a priori, a set of rules can be generated for computing tags. To be compatible with JPEG, and to reduce computation and storage costs, features are computed for all 8×8 pixel blocks in the input image.

Texture is a fundamental property of images that is important in discrminating between the regions. Intuitively, texture is simply the small-scale patterning that gives an image its feel of being more or less "busy." Flat regions, which are essentially featureless, have the smallest texture. Contone regions, where there are smooth variations from one pixel to the next, have higher texture. Lineart regions (e.g., text), having frequent, sharp changes, come next. Finally, detailed regions have the highest texture because of the presence of halftone or error diffusion dots (or a portion of a photograph of a field of grass, for example). Various algorithms for distinguishing regions by texture can be used with the invention. The method disclosed below uses thresholded second order differences between neighboring pixels to determine texture.

Figure 6:
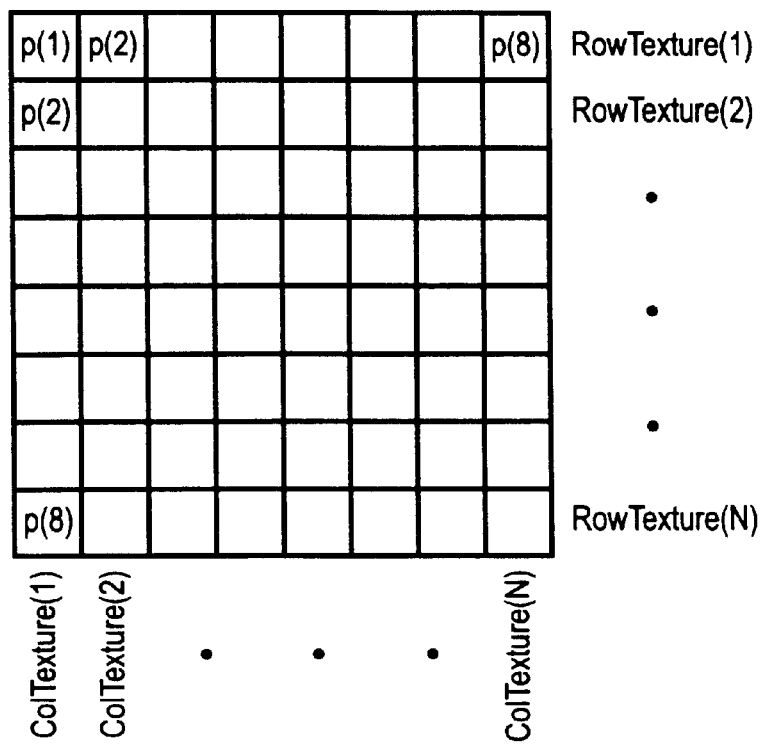
FIG. 6 illustrates texture ordering for an N×N pixel block according to an embodiment of the invention.

Row texture and column texture are one-dimensional textures defined along the horizontal and vertical directions, respectively, as illustrated in FIG. 6. With one embodiment of the spatial segmentation method, a texture histogram ($Hist_{\mu\nu}$) for an 8×8 block at row $\mu$ and column $\nu$ of the image is obtained from one-dimensional row texture and column texture functions (RT and CT, respectively) that give an indication of busyness of a row or a column. The histogram is then mapped into an image type tag ($T_{\mu\nu}$), which is a fuzzy number in the interval [0 1] or an image type identifier indicative of the degree of busyness in the block. A new Q*-table is then generated or chosen based on $T_{\mu\nu}$. The busyness $T_{\mu\nu}$ of the block can be generated as some function of $Hist_{\mu\nu}$, or the texture histogram can itself be used to generate or choose the Q*-table.

Figure 10:
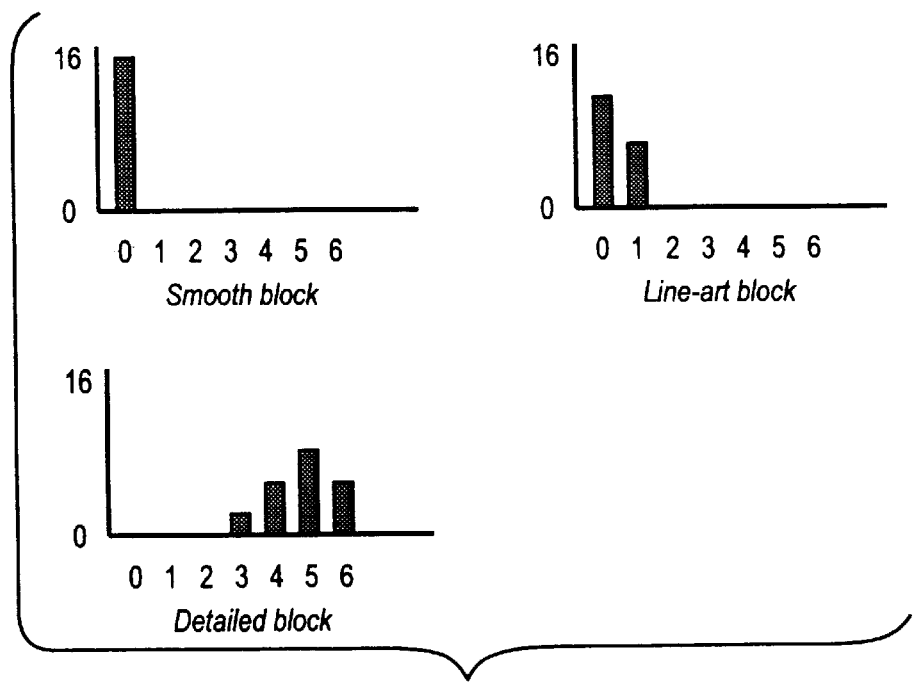
FIG. 10 shows typical texture histograms in 8×8 blocks of different textures.

In the embodiments discussed herein, entries in a texture histogram for an 8-pixel row or column can range between 0 and 12. Since in practice the texture histogram entries will usually be even integers, each RT and CT value is divided by 2 and truncated, so that the entries in the texture histogram will range between 0 and 6. This reduces the number of registers needed almost by half. FIG. 10 shows resulting 7-value texture histograms ($Hist_{\mu\nu}$) for 8×8 blocks representative of different image types.

Alternatively, the busyness $T_{\mu\nu}$ of the block can be generated as a function of the individual row textures RT and column textures CT of the pixel block, for example by averaging them all together. One embodiment for using the histogram method and one embodiment for using the non-histogram method are described below, although many different embodiments utilizing variations on the algorithms described below can be implemented.

Figure 7:
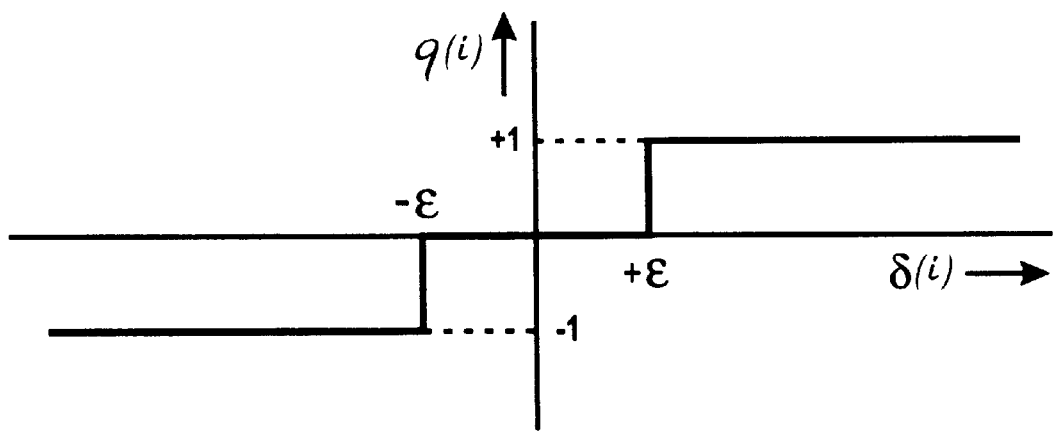
FIG. 7 illustrates a quantization function used in adaptive quantization according to an embodiment of the invention.

With reference to the embodiments of the invention described below, the row texture and column texture functions are defined as follows. For each 1×N pixel row i in the block, the differences $\delta_r(i,0)$, $\delta_r(i,1)$, ..., $\delta_r(i,j)$, ..., $\delta_r(i,N-2)$ between successive pixel values p(i,0), p(i,1), ..., p(i,j), ..., p(i,N-1) are computed, where $\delta_r(i,j)$ is defined as p(i,j+1)−p(i,j). Each $\delta_r(i,j)$ is quantized as illustrated in FIG. 7, to desensitize the texture computation to background noise. The output of this quantization, $q_r(i,j)$, is either −1, 0, or +1, depending on whether the value of $\delta_r(i,j)$ is respectively less than −$\epsilon$, between −$\epsilon$ and $\epsilon$, or greater than +$\epsilon$. The parameter $\epsilon$ is a measure of the pixel-to-pixel noise that should be ignored in the computation of texture. If such background page noise is not ignored the entire image will have high texture, and the ability of the texture function to discriminate between different regions will be severely compromised.

The final step in the computation of row texture (RT) is to calculate the sum of the absolute values of the differences between successive values of $q_r(i,j)$:

$$RT=\Sigma|q_r(i,j+1)-q_r(i,j)|$$

A row texture value RT is computed for each row i of a pixel block, and a column texture value CT is similarly computed for each column j of the pixel block, where:

$$\delta_c(i,j)=p(i+1,j)-p(i,j);$$

$$\delta_c(i,j) \to q_c(i,j); \text{ and}$$

$$CT=\Sigma|q_c(i+1,j)-q_c(i,j)|$$

As an alternative to the histogram method, a single texture value $T_{uv}$ can be calculated for each pixel block in image row u and image column v by averaging all sixteen RT and CT texture values for the block, and normalizing the result (e.g., to a value between 0 and 1). Both methods of determining $T_{uv}$ are explained with reference to FIGS. 8a–8d, although it will be understood that either method may be practiced according to the invention.

Figure 8A:
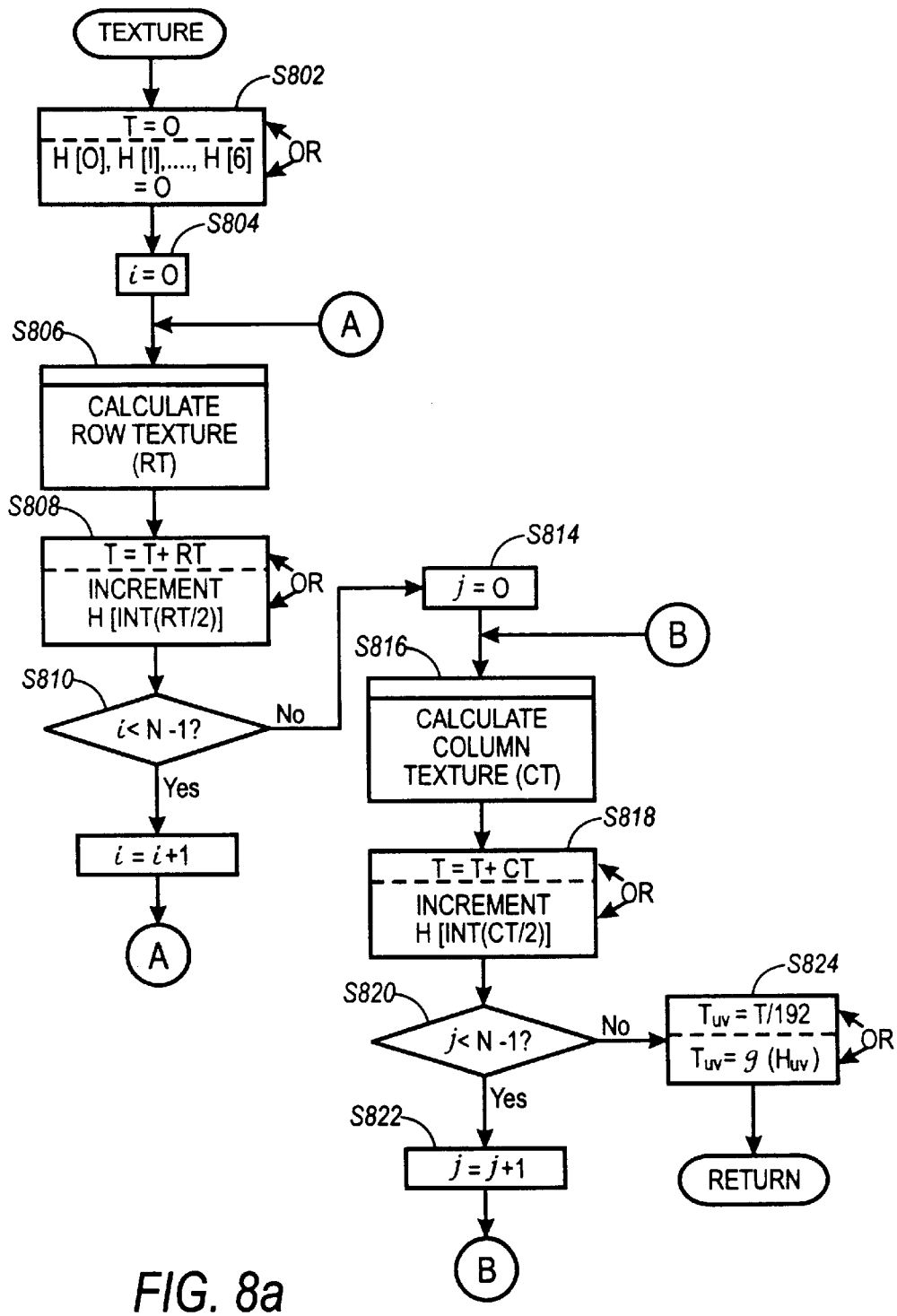
FIG. 8a illustrates a process for calculating total pixel block texture and a pixel block texture histogram according to an embodiment of the invention.

Texture determination is now described with reference to FIG. 8a. At step S802, if the histogram method of textured determination is being used, all 7 values of a block histogram array H[ ] are initialized to 0. If the histogram method is not being used, a total texture value register T is initialized to 0.

At step S804, a row index i is initialized to 0. At step S806, the row texture RT for row i of the pixel block is calculated, as explained below with reference to FIG. 8b. At step S808, if the histogram method is being used H[t] is incremented, where t corresponds to the row texture RT of row i. Since in this embodiment the histogram H[ ] has 7 array entries and the maximum row texture RT is 12, the row texture RT is divided by 2 and the result truncated to identify H[t], i.e., t=Int(RT/2). If the histogram method is not being used, at step S808 the block texture register T is increased by the row texture value RT of pixel block row i.

At step S810, if i is less than N−1, then i is incremented at step S812 and the process returns to step S806 to calculate the row texture RT for the next row i. If i is not less than N−1 at step S810, this means that the row textures RT for all the rows in the pixel block have been calculated and reflected in either the histogram array or the block texture register T. In that case the process advances to step S814, where the column index j is initialized to zero in order to begin the column texture value CT calculation for the pixel block. Then the process advances to step S816.

Figure 8B:
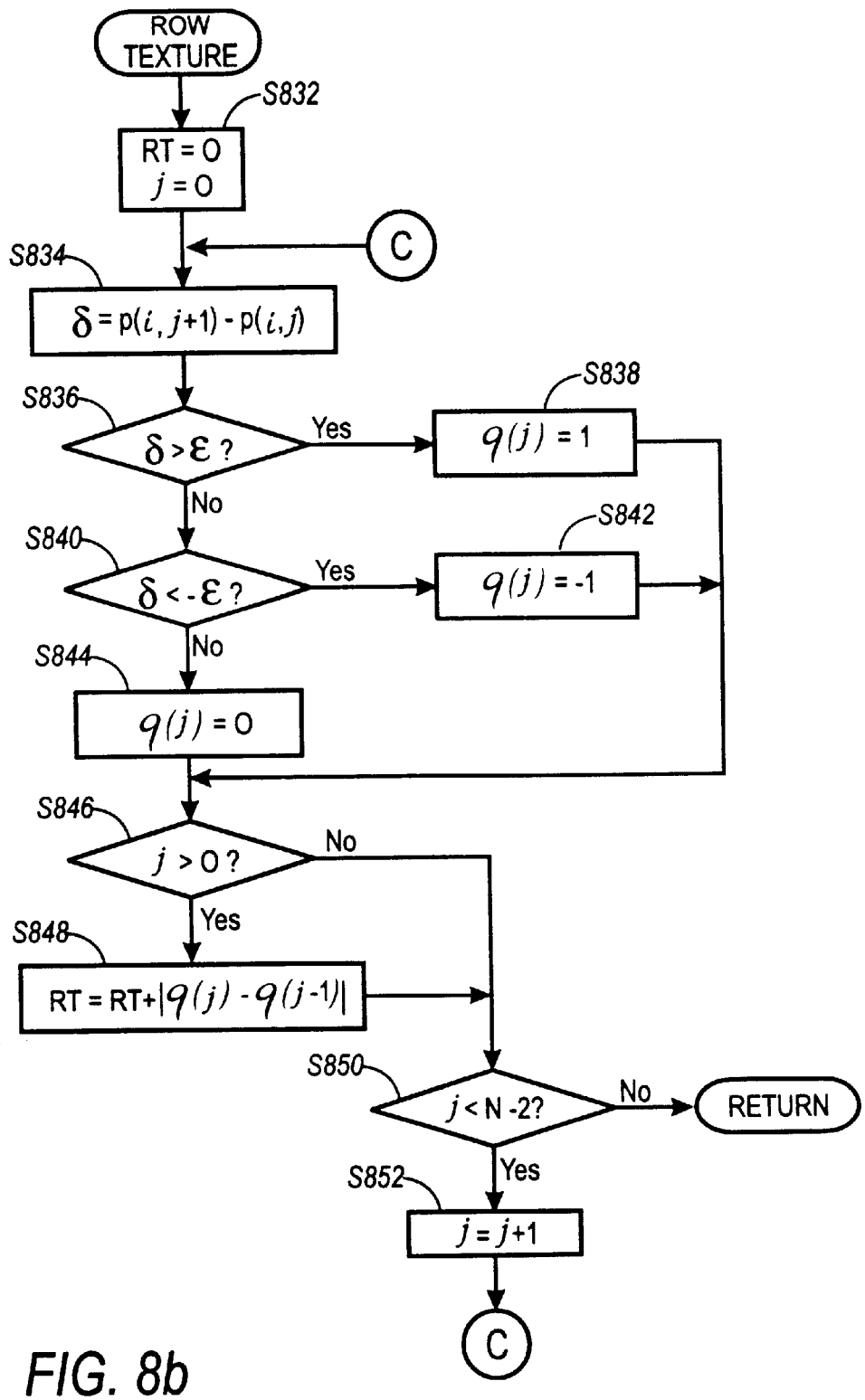
Figure 8C:
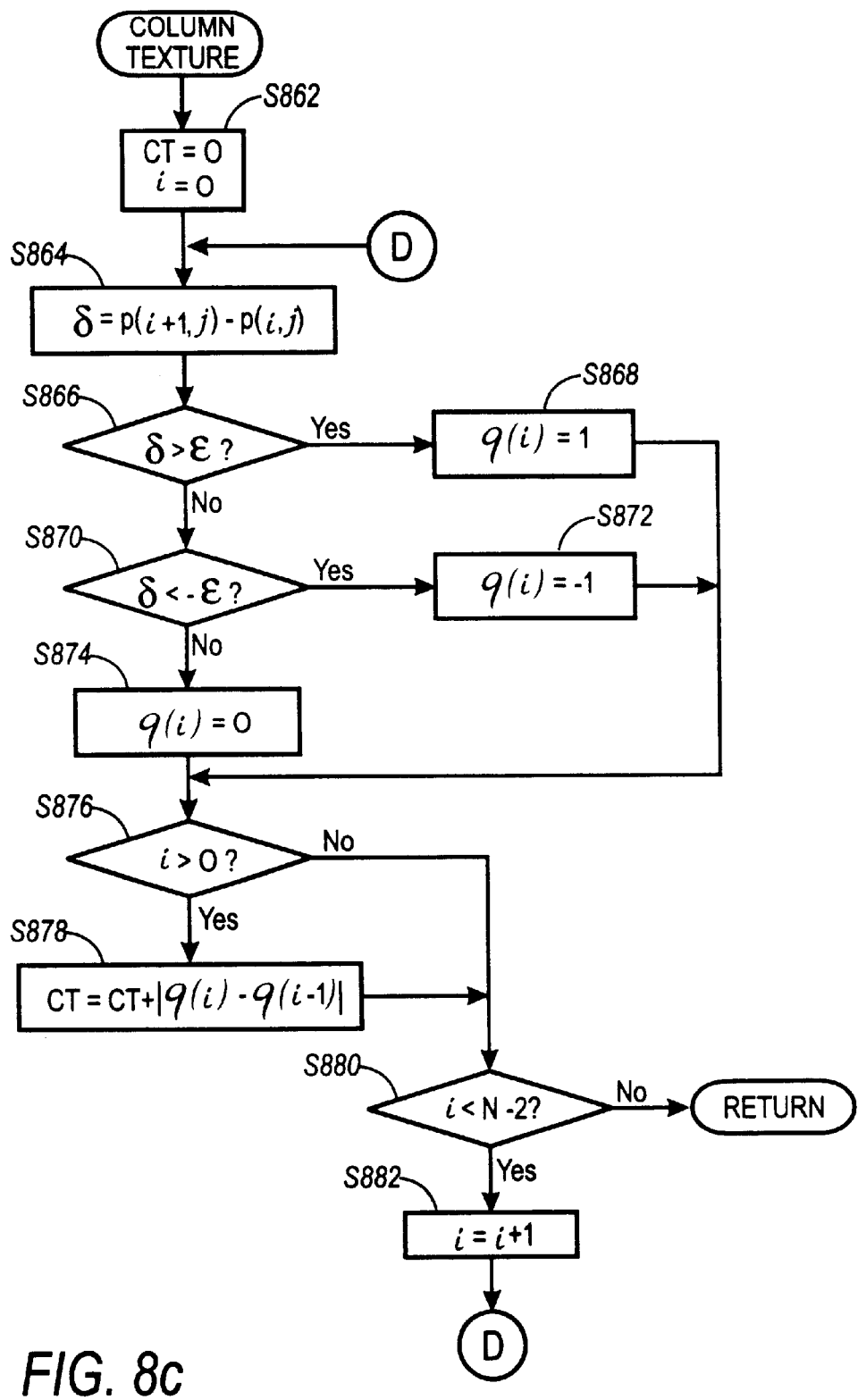

At step S816, the column texture CT for column j of the pixel block is calculated according to the method described below with reference to FIG. 8c. At step S808, H[t] is incremented if the histogram method is being used, with t=Int(CT/2). If the histogram method is not being used, at step S808 the block texture register T is increased by the column texture CT of pixel block column j.

At step S820, if j is less than N−1, then j is incremented at step S822 and the process returns to step S816 to calculate the column texture CT for the next column j. If j is not less than N−1 at step S820, then all the row textures RT and column textures CT have been calculated and summed into either the histogram array Hist$_{uv}$ or the block texture register T, so the process advances to step S824.

At step S824, the "busyness" tag $T_{uv}$ of the pixel block at row u and column v of the image is chosen or calculated. If the histogram method is being used, $T_{uv}$ is defined as a function of the total block histogram, as explained below with reference to FIG. 8d for example. If the histogram method is not being used, the busyness $T_{uv}$ is normalized to a value between 0 and 1 by dividing T by 192 (the product of the maximum RT, CT value (12) and the number (16) of columns plus rows in each pixel block).

A method of calculating texture along a row according to an embodiment of the invention is now described with reference to FIG. 8b. At step S832 the row texture value RT and a column index j are initialzed to zero (the row index i has been set by the calling routine shown in FIG. 8a). At step S834 the pixel value difference $\delta$ between adjoining pixel values (columns j+1 and j) in pixel block row i is calculated.

Then the pixel difference $\delta$ is quantized as follows. If $\delta$ is greater than $\epsilon$ at step S836, then at step S838 the quantized pixel difference q(j) is set equal to +1 and the process advances to step S846. Otherwise, the process continues at step S840. If the pixel difference $\delta(j)$ is less than −$\epsilon$ at step S840, then at step S842 the quantized pixel difference q(j) is set equal to −1 and the process advances to step S846. If at step S840 the pixel difference $\delta(j)$ is not less than −$\epsilon$, then at step S844 the quantized pixel difference q(j) is set equal to zero. Once the quantized pixel difference value q(j) is set at step S838, S842, or S844, the process continues with step S846.

If j=0 at step S846, the process advances to step S850. Otherwise, at step S848 the row texture value RT is increased by the absolute value of the difference between the current quantized pixel difference value q(j) and the previous quantized pixel difference value q(j−1). Then the process continues at step S850.

At step S850, the value of j is incremented. At step S852, if j does not exceed N−2 then j is incremented at step S852, and the process returns to step S834 where the quantized pixel difference value q(j) is calculated for the next pixel in the row. This process continues for the entire row of the pixel block, until j is not less than N−2 at step S850, which means that the total texture value RT has been calculated for the row.

Figure 8D:
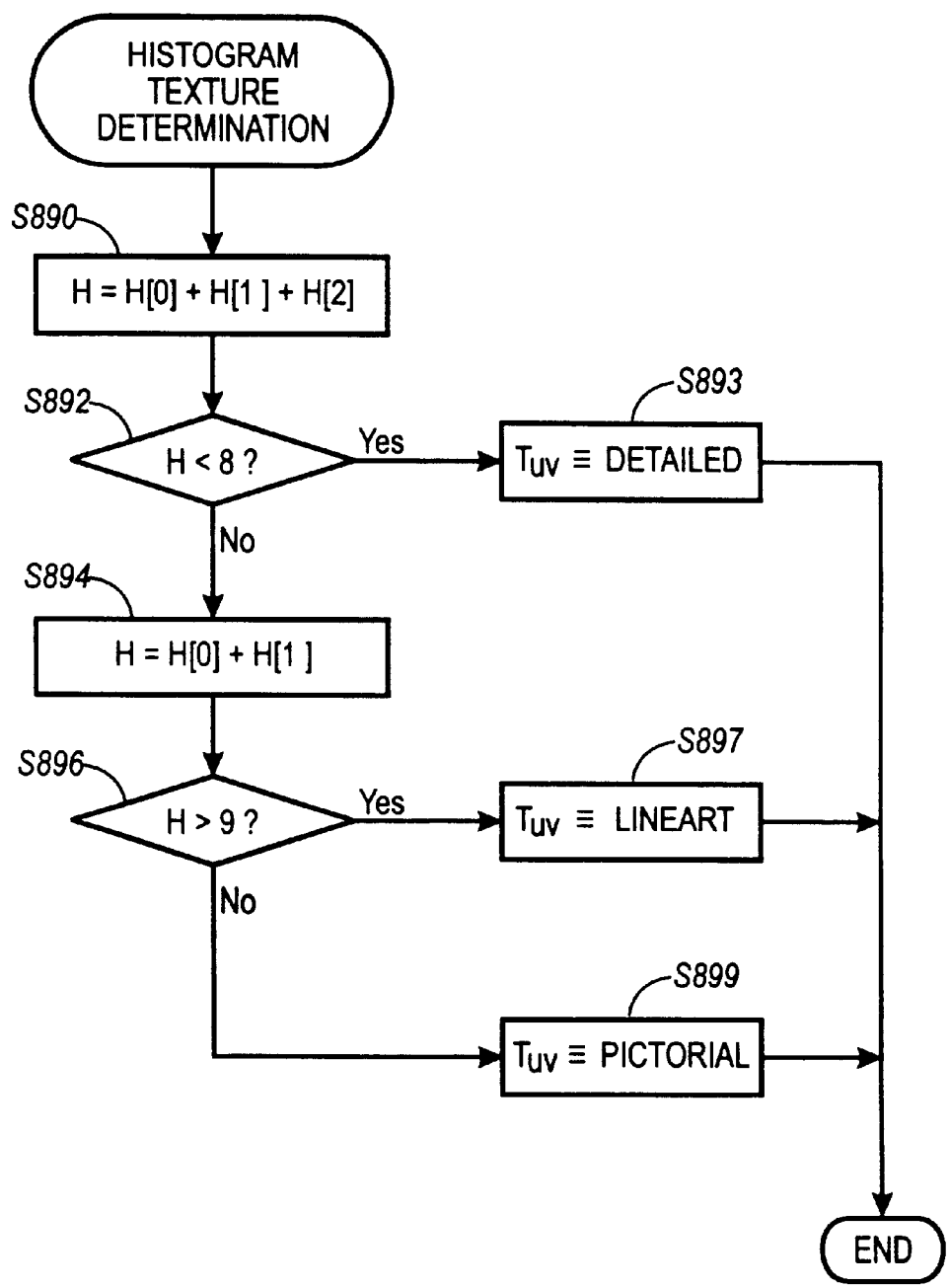
FIG. 8d illustrates an algorithm for obtaining an image type tag from a pixel block texture histogram.

Texture along a column, CT, is calculated in a similar manner. With reference to FIG. 8d, at step S862 the column texture value CT and a row index i are initialized to zero (the column index j has been set by the calling routine shown in FIG. 8a). At step S864 the pixel value difference $\delta$ between adjoining pixel values (rows i+1 and i) in pixel block column j is calculated.

Then the pixel difference $\delta$ is quantized as follows. If $\delta$ is greater than $\epsilon$ at step S866, then at step S868 the quantized pixel difference q(i) is set equal to +1 and the process advances to step S876. Otherwise, the process continues at step S870. If the pixel difference $\delta(i)$ is less than −$\epsilon$ at step S870, then at step S872 the quantized pixel difference q(i) is set equal to −1 and the process advances to step S876. If at step S870 the pixel difference $\delta(i)$ is not less than −$\epsilon$, then at step S874 the quantized pixel difference q(i) is set equal to zero. Once the quantized pixel difference value q(i) is set at step S868, S872, or S874, the process continues with step S876.

If i=0 at step S876, the process advances to step S880. Otherwise, at step S878 the column texture value CT is increased by the absolute value of the difference between the current quantized pixel difference value q(i) and the previous quantized pixel difference value q(i−1). Then the process continues at step S880.

At step S880, the value of i is incremented. At step S882, if i does not exceed N−2, then i is incremented at step S882, and the process returns to step S864 where the quantized pixel difference value q(i) is calculated as above for the next pixel in the column. This process continues for the entire column of the pixel block, until at step S880 i is not less than N−2, which means that the total texture value CT has been calculated for the column.

Figure 9A:
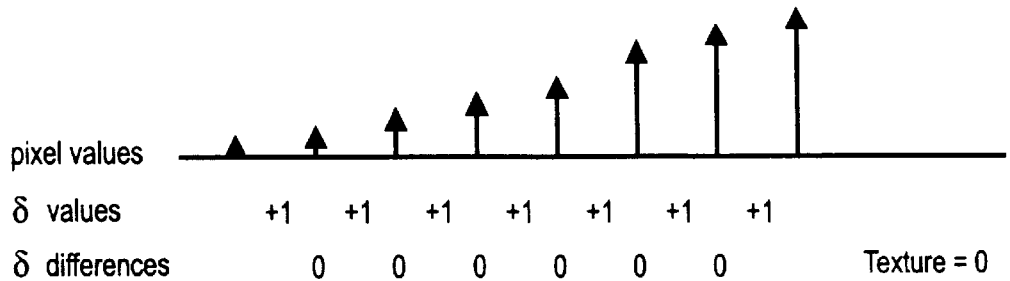
FIG. 9a shows how a constantly increasing row of pixels produces zero texture.
Figure 9B:
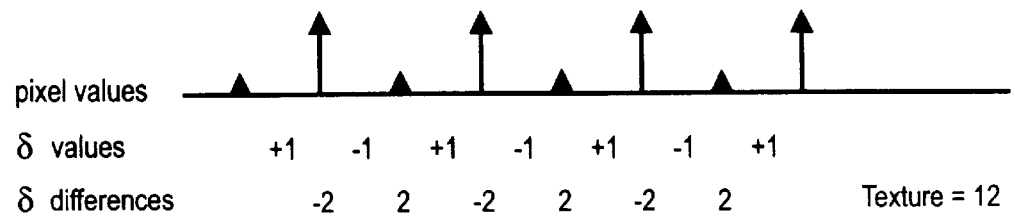
FIG. 9b shows how an alternating a, b pattern produces the largest value of texture.

The RT and CT functions described above analyze the significant pixel-to-pixel changes along a row and column, respectively. A change is deemed significant only if it is larger than some threshold, and if it is different from the immediately preceding value of the thresholded change. Thus, a row or column consisting of constant pixel values or monotonically increasing or decreasing pixel values, as illustrated in FIG. 9a, will produce a texture of zero value. In contrast, a row or column consisting of alternating pixel values a, b, a, b, a, b, a, b, as illustrated in FIG. 9b, produces the largest texture value as long as |b−a|>ε.

One property of the texture functions defined above is that they are quite sensitive to the value of ε. Therefore ε should be set to a value just a little larger than the page background noise that can be measured by a particular scanner. A typical ε value is in the range of 6 to 10, where pixels can have values from 0 to 255.

One possible algorithm for determining busyness $T_{uv}$ based on the texture histogram $Hist_{uv}$ for the block is now described with reference to FIG. 8d. In this example, at step S890 the first three values of the histogram array, representing counts of the lowest three possible row textures, are added together. At step S892, if the sum is less than 8, then $T_{uv}$ is set at step S893 to indicate that the block is to be classified as a detailed image portion. However, if the sum is not less than 8 at step S892, then a second sum is calculated at step S894, this time adding together only the first two values of the histogram array, and the process advances to step S896. If the second sum is greater than 9 at step S896, then $T_{uv}$ is set at step S897 to indicate that the image block is to be classified as lineart. However, if the second sum does not exceed 9 at step S896, then $T_{uv}$ is set at step S899 to indicate that the image block is to be classified as pictorial.

Figure 11:
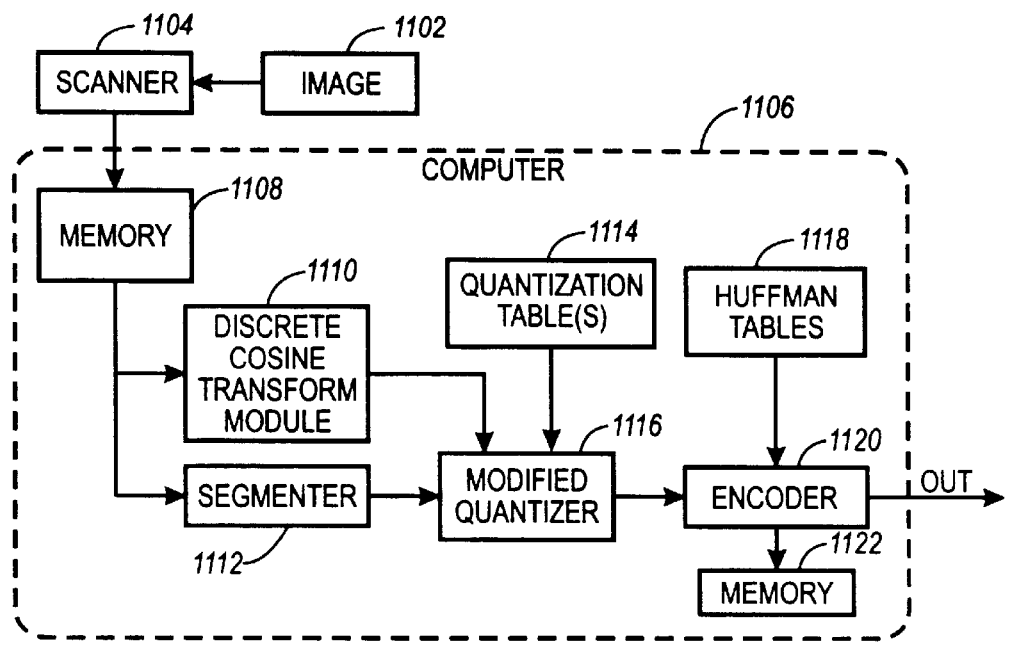
FIG. 11 illustrates an apparatus for performing modified quantization using spatial domain segmentation according to an embodiment of the invention.

FIG. 11 illustrates an apparatus for performing modified quantization using spatial domain segmentation according to the invention. A computer 1106 includes a memory 1108, a discrete cosine transform module (DCTM) 1110, a segmenter 1112, one or more quantization tables 1114, a modified quantizer 1116, Huffman tables 1118, an encoder 1120, and a memory 1122.

A scanner 1104 scans an image 1102 and divides it into 8×8 pixel blocks. The digitized scan data are sent to a memory 1108 in the computer 1106. The DCTM 1110 performs a DCT on the pixel blocks. The segmenter 1112 classifies the pixel blocks based on pixel data stored in the memory 1108 using spatial domain segmentation, as described above.

Once the blocks have been classified according to image type by the segmenter 1112, the modified quantizer 1116 performs thresholding and/or quantizing of the DCT result from the DCTM 1110, using quantization tables 1114 either selected or modified based on the image type. Once quantization has been performed by the modified quantizer 1116, the computer resident encoder 1120, using Huffman tables 1118, encodes the pixel block data and outputs and/or stores the result in a memory 1122.

Classification of a pixel block by image type in order to select a preferred Q*-table for adaptive quantization can also be performed using frequency domain segmentation based on a function of the DCT coefficients of the pixel block. For example, pixel blocks may be classified based on respective magnitudes of DCT coefficients representing low frequency and high frequency AC components. One method of doing so in an embodiment of the invention is given below.

In this embodiment for frequency domain segmentation, first the number ($N_{low}$) of the $n_{low}$ lowest frequency AC coefficients that exceed a threshold amplitude $k_{low}$ is determined, and the number ($N_{high}$) of the $n_{high}$ highest frequency AC coefficients that exceed a threshold amplitude $k_{high}$ is determined. Then the block is classified as a function of $N_{low}$ (the number of significantly large low-frequency AC components) and $N_{high}$ (the number of significantly large high-frequency AC components). By choosing appropriate values for $n_{low}$, $n_{high}$, $k_{low}$, and $k_{high}$, the block can be tagged as one of several possible image type regions, such as lineart or detailed.

Step 1. Define the Q-table to be sent to the decoder;
Step 2. Perform modified quantization for each 8 × 8 pixel block:
    Step 2a. Calculate $N_{low}(u,v)$ and $N_{high}(u,v)$ for the pixel block;
    Step 2b. if $N_{low}(u,v) > c_{low}$ and $N_{high}(u,v) > c_{high}$ then
        set $T_{uv} = TAG_1$; but otherwise,
    Step 2c. set $T_{uv} = TAG_2$;
    Step 2d. modify quantization of the 8 × 8 pixel block as a function of the Q-table and $T_{uv}$; and
    Step 2e. perform entropy encoding of pixel block; and
Step 3. Repeat step 2 until all blocks in the image are processed.

The above algorithm illustrates one possible frequency domain segmentation rule that can be used to classify a pixel block. This embodiment classifies image blocks between lineart-type and detailed-type only. $TAG_1$ and $TAG_2$ are fuzzy numbers between zero and one that indicate the degrees of busyness of a block. u is an index for the row of the image that contains the block, and v is an index for the image column containing the block. The values $c_{low}$, $c_{high}$, $TAG_1$, and $TAG_2$ can be chosen empirically to produce the best result. The following values have been used with some success with this algorithm: $k_{low}$=31; $k_{high}$=32; $n_{low}$=32; $n_{high}$=8; $c_{low}$=5; $c_{high}$=20; $TAG_1$=lineart; and $TAG_2$=detailed.

The algorithm below illustrates another embodiment for this method, one that identifies up to four different image types for each pixel block. The values $c_{low1}$, $c_{high1}$, $c_{low2}$, $c_{high2}$, $TAG_1$, $TAG_2$, $TAG_3$, and $TAG_4$, can be chosen empirically to produce the best result.

Step 1. Define the Q-table to be sent to the decoder;
Step 2. Perform modified quantization for each 8 × 8 pixel block:
    Step 2a. Calculate $N_{low}(u,v)$ and $N_{high}(u,v)$ for the pixel block;
    Step 2b. if $N_{low}(u,v) > c_{low1}$ and $N_{high}(u,v) > c_{high1}$ then
        set $T_{uv} = TAG_1$; but otherwise,
    Step 2c. if $N_{low}(u,v) > c_{low2}$ and $N_{high}(u,v) > c_{high2}$ then
        set $T_{uv} = TAG_2$; but otherwise,
    Step 2d. if $N_{low}(u,v) > c_{low1}$ and $N_{high}(u,v) > c_{high2}$ then
        set $T_{uv} = TAG_3$; but otherwise,
    Step 2e. set $T_{uv} = TAG_4$;

-continued

Step 2f. modify quantization of the 8 × 8 pixel block as a
   function of the Q-table and $T_{uv}$; and
Step 2g. perform entropy encoding of pixel block; and
Step 3.    Repeat step 2 until all blocks in the image are processed.

The above algorithms identify only up to four image types, but finer grain image type discrimination can be carried out using the same general method in other embodiments. For example, in the second algorithm shown above an additional TAG could have been defined for the case $\{N_{low}(u, v) > c_{low2}$ and $N_{high}(u,v) > c_{high1}\}$. In other embodiments, additional image types can also be identified by defining addition-al $c_{low}$ and $c_{high}$ values. With j different $c_{low}$ values and k different $c_{high}$ values, up to j·k+1 image type gradations can be identified in this way.

Figure 12A:
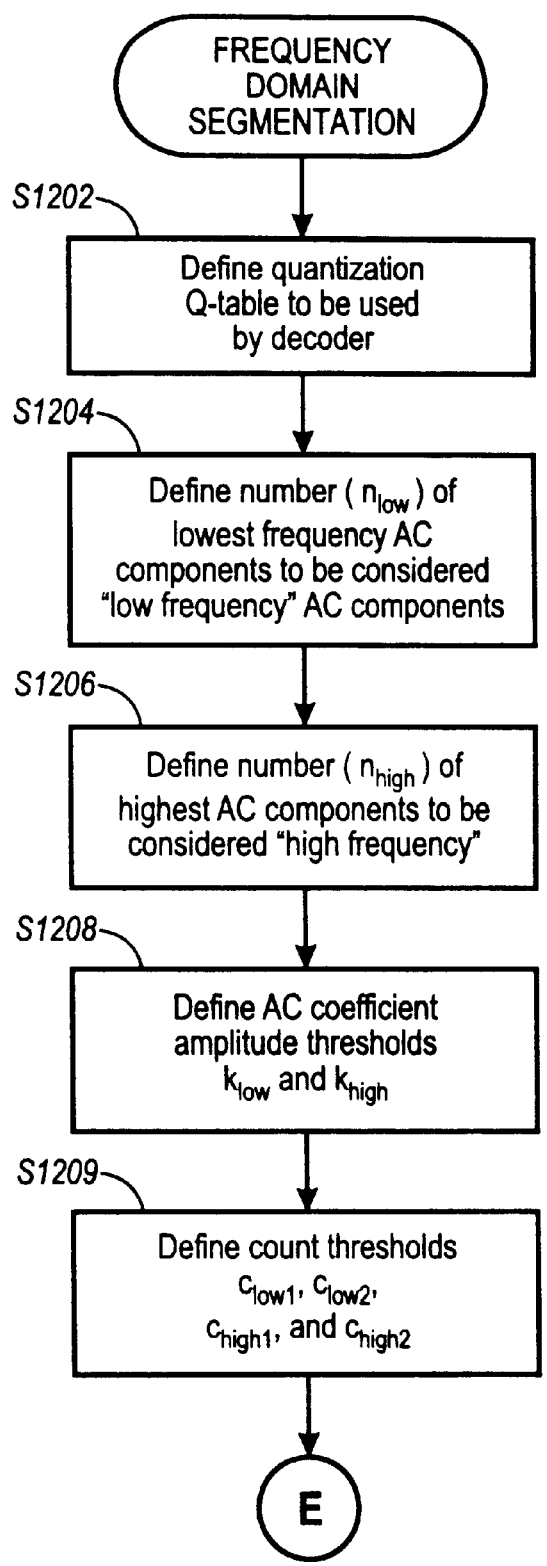
FIGS. 12a and 12b illustrate an algorithm for one embodiment of a frequency domain segmentation process according to an embodiment of the invention.
Figure 12B:
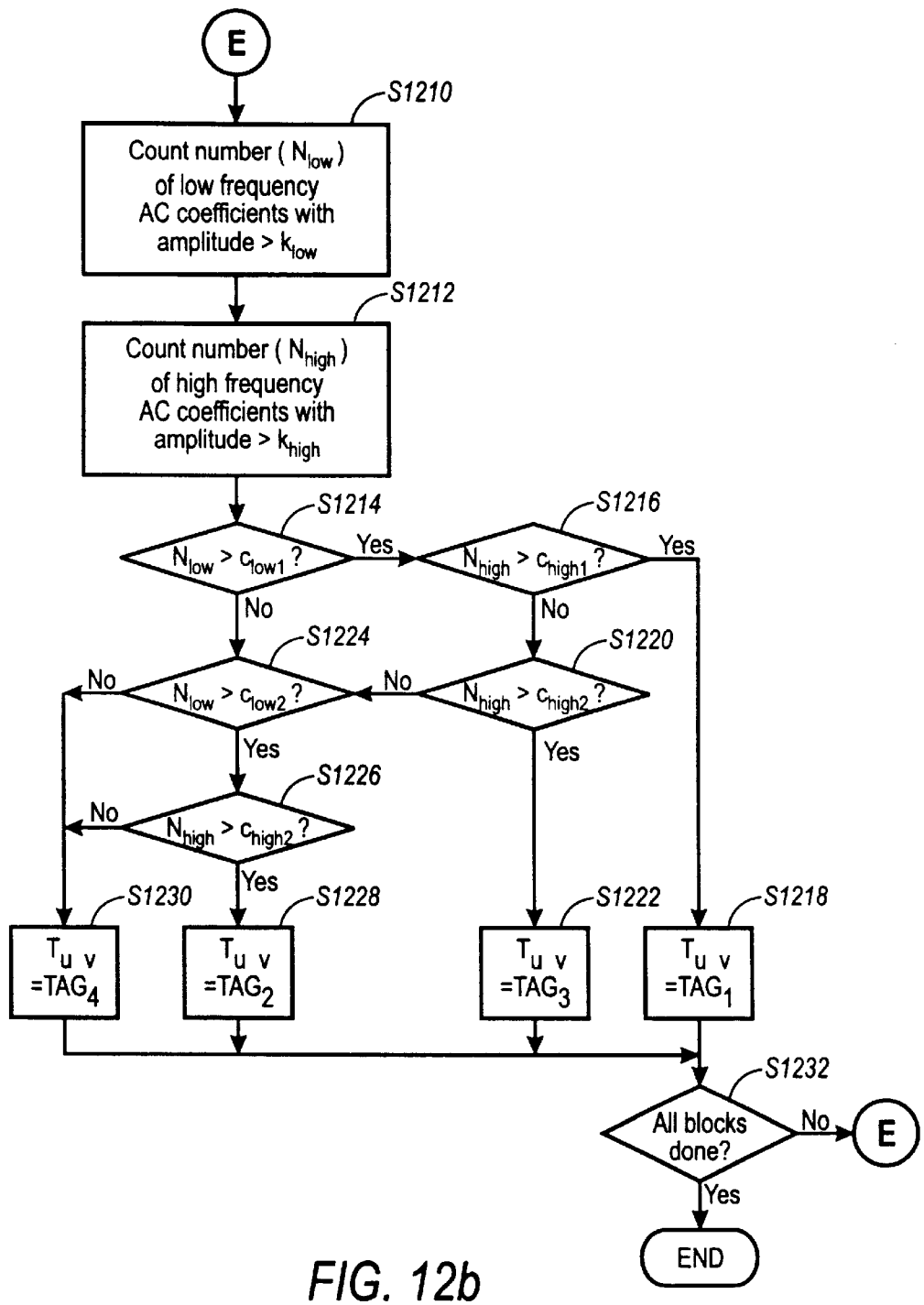

This frequency domain segmentation process is explained with reference to FIGS. 12a and 12b illustrating the first algorithm above. At step S1202, the Q-table to be sent to the JPEG decoder is defined. At step S1204, the number ($n_{low}$) of the lowest frequency AC components to be considered "low frequency" is defined. At step S1206, the number of ($n_{high}$) of the highest AC components to be considered "high frequency" is defined. At step S1208, the AC component low amplitude threshold ($k_{low}$) and the AC component high amplitude threshold ($k_{high}$) are defined. At step S1209, the low frequency and high frequency threshold values $c_{low1}$, $c_{high1}$, $c_{low2}$, and $c_{high2}$ are defined.

Then the process continues with a block-by-block, image-type (TAG) determination. At step S1210, the number ($N_{low}$) of the $n_{low}$ lowest frequency AC components with an amplitude greater than $k_{low}$ is determined. At step S1212, the number ($N_{high}$) of the $n_{high}$ highest frequency AC components that have an amplitude greater than $k_{high}$ is determined.

If $N_{low}$ is greater than $c_{low1}$ at step S1214, then $N_{high}$ is compared with $c_{high1}$ at step S1216. If $N_{high}$ is greater than $c_{high1}$ at step S1216, then $T_{uv}$ is set to TAG$_1$ at step S1218 and the process continues at step S1232. If $N_{low}$ was found to be greater than $c_{low1}$, at step S1214, but $N_{high}$ was not found to be greater than $c_{high1}$ at step S1216, then $N_{high}$ is compared with $c_{high2}$ at step S1220. If $N_{high}$ is greater than $c_{high2}$ at step S1220, then $T_{uv}$ is set equal to Tag$_3$ at step S1222, and the process continues at step S1232.

However, if $N_{low}$ was not found to be greater than $c_{low1}$ at step S1214, or if $N_{high}$ was not found to be greater than $c_{high2}$ at step S1220, then the process continues at step S1224. If $N_{low}$ is greater than $c_{low2}$ at step S1224, then $N_{high}$ is compared with $c_{high2}$ at step S1226. If $N_{high}$ is greater than $c_{high2}$ at step S1226, then $T_{uv}$ is set equal to TAG$_2$ at step S1228. However, if $N_{low}$ was not found to be greater than $c_{low2}$ at step S1224, or if $N_{high}$ was not found to be greater than $c_{high2}$ at step S1226, then $T_{uv}$ is set equal to Tag$_4$ at step S1230.

Once the value for $T_{uv}$ is set at step S1218, S1222, S1228, or S1230, the process continues at step S1232. If the process has not yet been performed for all blocks in the image at step S1232, the process returns to step S1210, where the above segmentation procedure is repeated to find the correct $T_{uv}$ for the next sequential block in the image. If the process has been performed for all blocks in the image at step S1232, the process is complete.

Figure 13:
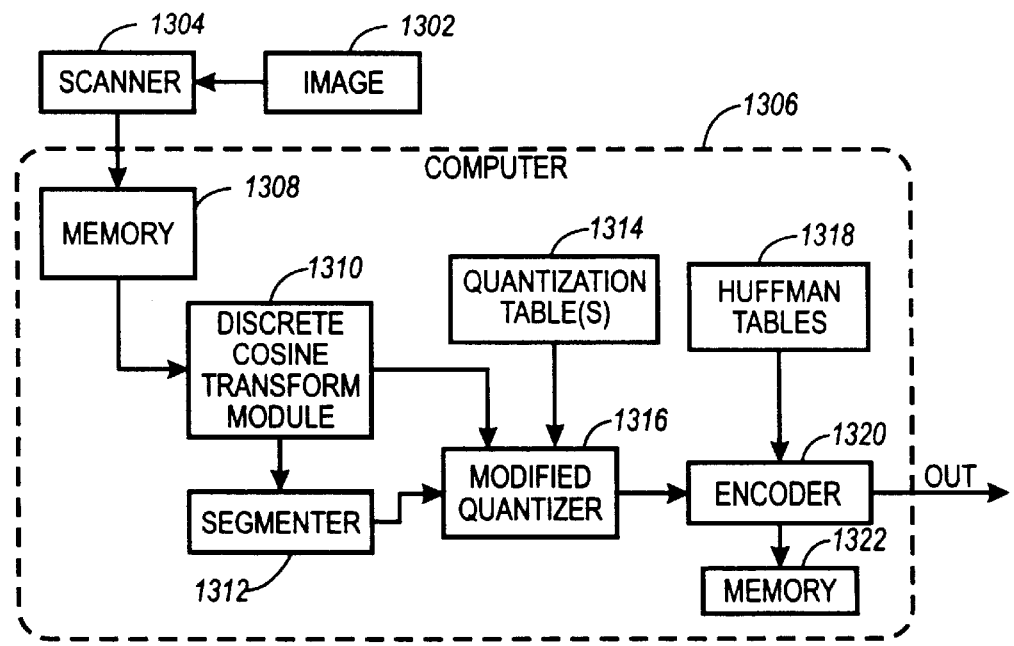
FIG. 13 illustrates an apparatus for performing modified quantization using frequency domain segmentation according to an embodiment of the invention.

FIG. 13 illustrates an apparatus for performing modified quantization using frequency domain segmentation according to the invention. A computer 1306 includes a memory 1308, a discrete cosine transform module (DCTM) 1310, a segmenter 1312, one or more quantization tables 1314, a modified quantizer 1316, Huffman tables 1318, an encoder 1320, and a memory 1322.

A scanner 1304 scans an image 1302 and divides it into 8×8 pixel blocks. The digitized scan data are sent to a memory 1308 in the computer 1306. The DCTM 1310 performs a DCT on the pixel blocks. The segmenter 1312 classifies the pixel blocks using frequency domain segmentation based on the DCT coefficients calculated by the DCTM 1310, as described above.

Once the blocks have been classified according to image type, the modified quantizer 1316 performs thresholding and/or quantizing of the DCT coefficients that result from the DCTM 1310, using one or more quantization tables 1314 either selected or modified based on the result from the segmenter 1312, according to the invention, as described above. Once quantization has been performed by the modified quantizer 1316, the computer resident encoder 1320, using Huffman tables 1318, encodes the pixel block data and outputs and/or stores the result in a memory 1322.

With reference once more to FIGS. 4 and 5, once a pixel image block has been classified by image type, modified quantization 408F is performed to best quantize the block according to its particular image type classification. In one embodiment, tags are first generated by the segmentation function 406F described above to quantize the DCT coefficients. Then, with reference to FIG. 5, the DCT coefficients 104 resulting from a DCT performed on an 8×8 pixel block as described above are thresholded by a Q*-table 506 that varies depending on the determined image type of the pixel block.

An appropriate quantization modification table can be retrieved from a look-up table depending on $T_{uv}$, or the quantization modification table can be generated by some function of $T_{uv}$ and the coefficients of the Q-table 406 that will be passed to the decoder. For example, if $T_{uv}$=0.9 indicates a detailed region, the function can non-linearly adjust values of a text-optimized Q-table 406 to arrive at the Q*-table 506 values. In this way, a new Q*-table can be generated from the original table as a function of the segmentation tag $T_{uv}$.

Once an appropriate Q*-table is chosen or generated, the DCT coefficients 104 are thresholded based on the quantization modification table. This has the effect of zeroing out the coefficients that do not contribute to the visual quality of the block. In effect, low magnitude coefficients are zeroed out when coarser quantization is desired, but only the finer quantization Q-table is sent to the decoder. Note that the Q*-table can be identical to the original Q-table if the segmentation tag indicates a lineart-type (e.g., text-type) region.

Once the modified DCT coefficients 507 are obtained they are quantized by the original Q-table 406 to obtain quantized DCT coefficients $(Sq^*_{00}, Sq^*_{01}, \ldots, Sq^*_{xy}, \ldots, Sq^*_{77})$ 508 by dividing each $S^*_{xy}$ by its corresponding $Q_{xy}$, and rounding the result to the nearest integer. The following algorithm illustrates the process:

Define $Q^*_{xy}$ as a function of $Q_{xy}$ and $T_{uv}$,
   where $T_{uv}$ = segmentation tag;
Threshold the DCT coefficient $S_{xy}$ such that:
   if $S_{xy} < Q^*_{xy}$ then $S^*_{xy} = 0$, but otherwise $S^*_{xy} = S_{xy}$; and
Quantize $S^*_{xy}$ using the Q-table:
   $Sq^*_{xy} = \text{Round}(S^*_{xy}/Q_{xy})$.

In an alternative embodiment of the invention, instead of being used for thresholding, the Q*-table 506 can be directly used for quantization of the DCT coefficients 104, in place of the Q-table 406 that will be passed to the decoder. Each resulting quantized coefficient $Sq^*_{xy}$ is then multiplied by a scaling factor obtained by dividing the Q*-table coefficient $Q^*_{xy}$ by its corresponding Q-table coefficient $Q_{xy}$. The following algorithm illustrates this alternative process:

Define $Q^*_{xy}$ = as a function of $Q_{xy}$ and $T_{uv}$,
  where $T_{uv}$ = segmentation tag,
  such that $Q^*_{xy} \geq Q_{xy}$; and
Quantize $S^*_{xy}$ using the Q*-table, and scale based on the Q-table:
  $Sq^*_{xy}$ = Round$\{Q^*_{xy}$ Round$(S_{xy}/Q^*_{xy})/Q_{xy}\}$.

Actual examples of compression using modified quantization according to the first quantization modification algorithm above are discussed below with reference to FIGS. 14a–14c, 15a–15e, 16a–16e, and 17a–17e. FIG. 14a shows a text-optimized Q-table that will be sent to the JPEG decoder. FIG. 14b shows a quantization table that would produce better compression than the Q-table of FIG. 14a, without unduly producing undesirable artifacts discernible to the human eye in the decompressed JPEG image, when applied to a pictorial-type image. Similarly, FIG. 14c shows a quantization table that could be used for even greater compression in a detailed-type image region (e.g., halftone), without unduly producing undesirable artifacts discernible to the human eye. The following examples show how a detailed image, a pictorial image, and text image, respectively, will be quantized for JPEG encoding in an embodiment of the invention.

FIG. 15a shows a raw-data example of an 8×8 halftone pixel block that has been classified as detailed-type. Performing a DCT on the pixel block results in the DCT coefficients shown in FIG. 15b, in block order format, which correspond to the $S_{xy}$ coefficients 104 in FIGS. 2 and 5. FIG. 15c shows an example of a Q*-table optimized for pixel blocks classified as detailed-type (same values as in FIG. 14c). The Q*-table coefficients correspond to the $Q^*_{xy}$ coefficients 506 of FIG. 5.

A thresholded DCT table 507 shown in FIGS. 5 and 15d is generated by a thresholding function 407F in this embodiment by setting every DCT coefficient $S_{xy}$ of FIG. 15b to zero if its magnitude does not equal or exceed the corresponding threshold value $Q^*_{xy}$ in the thresholding Q*-table of FIG. 15c. For example, with reference to FIGS. 15b, 15c, and 15d, the thresholded DCT coefficient $S^*_{30}$ is –35 because the threshold Q*-table coefficient $Q^*_{30}$=33 is not greater than the magnitude of the corresponding DCT data coefficient l$S_{30}$l=35. However, the threshold DCT coefficient $S^*_{32}$ is zero because the threshold Q*-table coefficient $Q^*_{32}$=105 is greater than the magnitude of the corresponding DCT data coefficient l$S_{32}$l=94.

A quantizing function 108F is performed on the thresholded DCT table 507, using the text-optimized Q-table 406 shown in FIGS. 5 and 14a, to obtain the quantized DCT coefficients 508 shown in FIGS. 5 and 15e. The quantized DCT coefficient $Sq^*_{10}$ is –8 because $S^*_{10}/Q_{10}$=Round(–81/10)=–8. As a result, upon decoding the JPEG compressed image the decoded coefficient will be –8×10=–80. Thus, in this embodiment the image type sensitive threshold Q*-table 506 is used for thresholding, but the text-optimized Q-table 406 that will be used for decoding is also used for quantizing the thresholded values.

FIGS. 16a–16e give an example of the same embodiment of the invention applied to a pictorial-type pixel block, shown in FIG. 16a. Performing a DCT on this pixel block results in the DCT coefficients shown in FIG. 16b. In this case, a threshold Q*-table 506 for pixel blocks classified as pictorial, shown in FIGS. 5, 14b, and 16c, is applied to the DCT table of FIG. 16b, resulting in the thresholded DCT table 507 shown in FIGS. 5 and 16d. In this case, the resulting threshold DCT coefficient $S^*_{70}$ is zero because $Q^*_{70}$=59 is greater than l$S_{70}$l=21, whereas if the text optimized Q-table of FIG. 14a had been used, the thresholded DCT coefficient $S^*_{70}$ would have been –21 because $Q_{70}$=16 in FIG. 14a is not greater than l$S_{70}$l=21.

Finally, the resulting thresholded DCT coefficients S* are quantized using the text-optimized Q-table 406 shown in FIGS. 5 and 14a, resulting in the quantized DCT coefficients 508 shown in FIGS. 5 and 16e. Again, in this embodiment the image type sensitive threshold Q*-table 506 is used for thresholding, but the text-optimized Q-table 406 that will be used for decoding is also used for quantizing the thresholded values.

Figure 1:
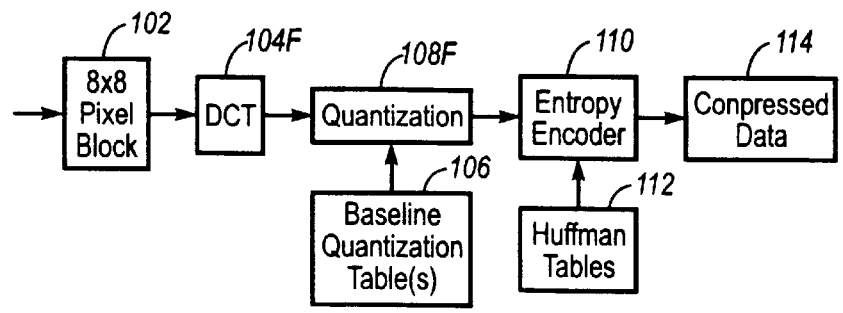
FIG. 1 is a functional chart for a JPEG compliant technique.

Finally, FIGS. 17a–17e illustrates how this embodiment of the invention can be applied to a text-type pixel block, shown in FIG. 17a Performing a DCT on this pixel block results in the DCT coefficients shown in FIG. 17b. In one embodiment of the invention, processing can proceed as before, that is, the DCT coefficients 104 shown in FIGS. 1, 5, and 17b can be thresholded using a Q*-table 506 optimized for text, which in this case is identical to the Q-table shown in FIG. 14a The resulting thresholded DCT coefficients 507 shown in FIGS. 5 and 17c will result. When the thresholded DCT coefficients S* are quantized using the text-optimized Q-table 406, the quantized DCT coefficients 508 shown in FIGS. 5 and 17d will result.

Figure 2:
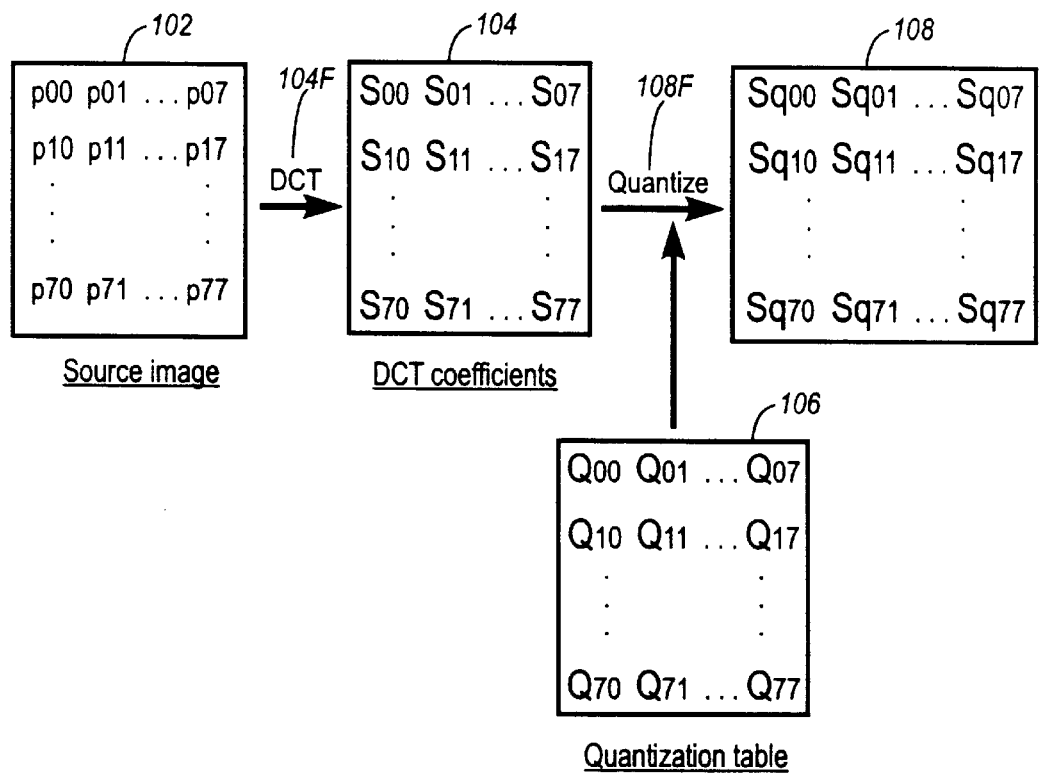
FIG. 2 illustrates a quantization process for JPEG compliant encoding.

However, since the Q-table 406 shown in FIG. 14a has already been optimized for text, thresholding the text type DCT coefficients before quantization may be considered unnecessary and even disadvantageous, because it can adversely affect image quality. Therefore, the thresholding step can be omitted whenever the image type requiring the finest quantization values (text, in this example) is being processed, as shown in FIG. 2. In this case, the FIG. 14a text-optimized Q-table 106, 406 will be used to directly quantize the FIG. 17b non-thresholded text DCT coefficients 104, and the result will be the FIG. 17e quantized DCT coefficients 108.

Figure 3:
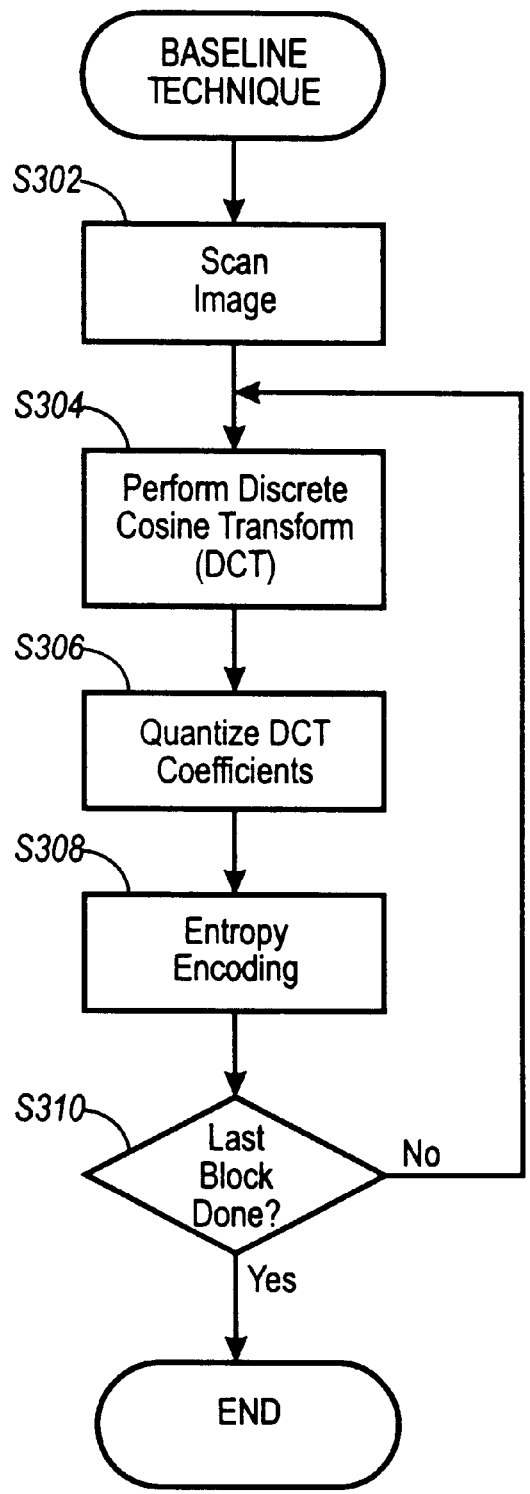
FIG. 3 is a flow chart for a JPEG compression technique.

Thus, with this embodiment, pixel blocks of image types capable of further compression without unduly degrading perceptual quality are thresholded before quantization. However, pixel blocks of the image type requiring the finest quantization values are quantized without thresholding, so that processing is equivalent to that shown in FIGS. 1–3 for those particular blocks.

Figure 18:
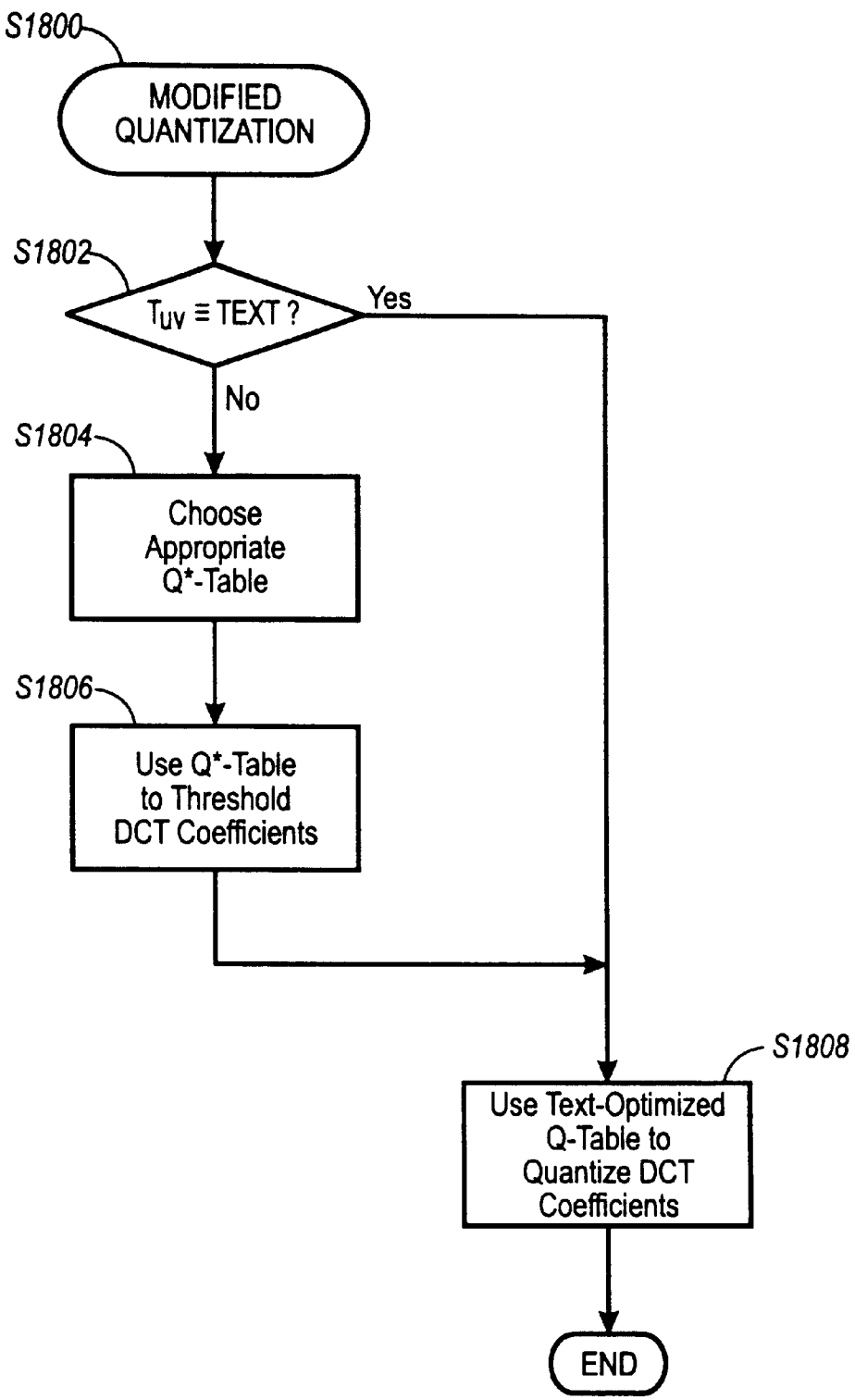
FIG. 18 is a flow chart for a JPEG compliant modified quantization technique according to an embodiment of the invention.

An embodiment of the method of the invention described above is illustrated in FIG. 18. At step S1800, segmentation has already been performed and the image-type tag $T_{uv}$ for a given pixel block has already been determined. At step S1802 the modified quantization module 408F checks whether $T_{uv}$ indicates an image type requiring the highest quality processing (i.e., text, when text is a possible one of the image types). If it does, the process advances to step S1808.

If $T_{uv}$ indicates an image type capable of further compression (e.g., pictorial or detailed) the appropriate quantization modification table (Q*-table) for that image type is chosen at step S1804, and the process continues with step S1806. At step S1806 the DCT coefficients of the pixel block are thresholded using the chosen Q*-table, and the process continues with step S1808. At step S1808 the resulting DCT coefficients, whether thresholded or not, are quantized using the highest quality (e.g., text-optimized) Q-table to be passed to the decoder.

The above method has been applied to several 400 and 600 dpi images, as shown in Table 2. For purposed of comparison, identical quantization tables (Q-tables) were employed at the encoder and the decoder to perform the JPEG and QSEG compression/decompression of the images of like resolution. Images of differing resolution were compressed and decompressed through the use of different Q-tables. "QSEG" refers to compression performed according to the invention.

TABLE 2

Compression Results

| Image | Resolution (dpi) | Size (MB) | QSEG Ratio | JPEG Ratio | Gain |
|---|---|---|---|---|---|
| 1 | 400 | 40.29 | 25 | 11 | 2.27 |
| 2 | 400 | 39.37 | 29 | 16 | 1.85 |
| 3 | 600 | 80.89 | 25 | 15 | 1.67 |
| 4 | 600 | 54.82 | 30 | 10 | 3.00 |
| 5 | 600 | 80.10 | 40 | 27 | 1.48 |
| 6 | 600 | 86.10 | 40 | 27 | 1.48 |
| 7 | 600 | 86.25 | 43 | 28 | 1.53 |
| 8 | 600 | 49.09 | 44 | 28 | 1.57 |
| 9 | 600 | 74.61 | 40 | 26 | 1.53 |
| 10 | 600 | 76.55 | 49 | 30 | 1.63 |
| 11 | 600 | 77.11 | 24 | 17 | 1.41 |
| 12 | 600 | 88.62 | 27 | 18 | 1.44 |
| 13 | 600 | 79.56 | 40 | 26 | 1.53 |
| 14 | 600 | 86.64 | 46 | 25 | 1.84 |
| 15 | 600 | 81.96 | 49 | 35 | 1.40 |

As can be seen from Table 2 above, quantization modification according to the invention generally results in a much improved compression ratio. Another advantage of this method is that the Q*-tables in an adaptive JPEG quantization scheme according to the invention can be continuously modified. Instead of generating a finite set of tags for each block to select among different compression techniques (which is also an option), this method provides a continuum function by which a new Q*-table can be separately generated from the original Q-table for each pixel block.

In summary, the present invention effectively achieves adaptive quantization resulting in improved compression without transmitting any additional information to the decoder. With quantization modification according to the invention, an image is segmented into pixel blocks, and the image type of each pixel block is determined separately. The DCT coefficients of each pixel block are modified before being quantized, or are quantized using a quantization modification table, based on the determined pixel block type. This results (after subsequent entropy encoding) in data having a greater compression ratio than would have been produced by using the same quantization table to directly quantize the DCT coefficients of every block of an image.

However, the resulting compressed data can still be decoded by a standard JPEG baseline decoder using a single quantization table (per image plane) passed to the decoder. No information concerning how the quantization table or the DCT coefficients were modified prior to compression need be passed to the decoder. Thus, existing JPEG decoders, including baseline sequential JPEG decoders that are incapable of supporting a large number of quantization tables, can be used to correctly decompress data that have been encoded according to the invention.

While this invention has been described in conjunction with specific embodiments outlined above, it is evident that many alternatives, modifications and variations will be apparent to those skilled in the art. For example, while the invention is compliant with the JPEG sequential mode, it can also be applied to JPEG progressive coding. As a further example, the invention can be implemented on a programmed general purpose computer, such as shown in FIGS. 11 and 13. However, the invention can be can implemented on a special purpose computer, a programmed microprocessor or microcontroller and peripheral integrated circuit elements, an ASIC or other integrated circuit, a hardwired electronic or logic circuit such as a discrete element circuit, a programmable logic device such as a PLD, PLA, FPGA or PAL, or the like. In general, any device capable of implementing the flowcharts shown in FIGS. 8a–8d, 12a, 12b, and 18 can be used to implement the invention.

Accordingly, the disclosed embodiments of the invention as set forth herein are intended to be illustrative, not limiting. Various changes may be made without departing from the scope of the invention as defined in the following claims.

What is claimed is:

1. A method for encoding data representing an image to produce output data from which the image can be effectively restored by a decoder, comprising:
   inputting image signal data representing at least one plane of the image, the image signal data including a first pixel block and a second pixel block, the first and second pixel blocks comprising data for a plurality of pixel rows and pixel columns in a respective regions of the image;
   obtaining first coefficients by performing a transform on the first pixel block;
   determining a first image type based on an analysis of the first pixel block;
   determining a first modification table optimized for quantizing coefficients representing an image of the first image type;
   determining a fine quantization table optimized for quantizing base image coefficients that could be produced by performing the transform on a base image type different from the first image type, the fine quantization table differing from the first modification table;
   obtaining first modified coefficients by modifying the first coefficients based on both the first modification table and the fine quantization table; and
   producing output data from which the image, including said respective regions of said image, can be effectively restored by the decoder, said output data including data representing the first modified coefficients and information concerning the fine quantization table, but being devoid of information describing said first modification table.

2. The method of claim 1, wherein the transform is a discrete cosine transform.

3. The method of claim 1, wherein the fine quantization table is a text-optimized quantization table and the decoder is JPEG compliant.

4. The method of claim 1, wherein obtaining the first modified coefficients includes:
   thresholding the first coefficients based on the first modification table to obtain first thresholded coefficients; and
   quantizing the first thresholded coefficients based on the fine quantization table.

5. The method of claim 4, wherein the transform is a discrete cosine transform.

6. The method of claim 4, wherein the fine quantization table is a text-optimized quantization table and the decoder is JPEG compliant.

7. The method of claim 1, further comprising:

obtaining second coefficients different from the first coefficients by performing the transform on the second pixel block;

determining a second image type different from both the first and the base image types, based on an analysis of the second pixel block;

determining a second modification table optimized for quantizing coefficients representing an image of said second image type, the second modification table differing from both the first modification table and the fine quantization table; and obtaining second modified coefficients by modifying the second coefficients based on both the second modification table and the fine quantization table, wherein the output data further includes data representing the second modified coefficients but is devoid of information describing said second modification table.

8. The method of claim 7, wherein obtaining the first and second modified coefficients includes:

thresholding the first coefficients based on the first modification table to obtain first thresholded coefficients;

thresholding the second coefficients based on the second modification table to obtain second thresholded coefficients; and quantizing both the first and second thresholded coefficients based on the fine quantization table.

9. The method of claim 1, wherein determining the first image type based on the analysis of the first pixel block comprises obtaining texture values along the pixel rows and pixel columns by a spatial domain analysis of the data for the plurality of pixel rows and pixel columns.

10. The method of claim 1, wherein determining the first image type based on the analysis of the first pixel block comprises:

obtaining texture values along the pixel rows and pixel columns by a spatial domain analysis of the data for the plurality of pixel rows and pixel columns;

calculating histogram values to determine a numerical distribution of the texture values obtained for the pixel rows and pixel columns; and determining the first image type based on the distribution of the texture values.

11. An apparatus for encoding an input data signal representing an image, comprising:

a transform module that receives data representing a block-like region of one plane of said image and performs a transform thereon to obtain transform coefficients corresponding to the data representing said region;

a segmenter that characterizes said block-like region as being of a first image type based on one of (1) the transform coefficients obtained by the transform module and (2) a spatial domain analysis of the data representing said region;

a modified quantizer that receives the transform coefficients from the transform module and obtains modified coefficients by modifying the transform coefficients as a function of both (1) a first quantization table optimized for quantizing the first image type and (2) a fine quantization table optimized for quantizing a base image type different from the first image type; and an output module that outputs the quantized coefficients along with information that identifies the fine quantization table, but does not identify the first quantization table.

12. The apparatus of claim 11, wherein the segmenter characterizes the image type of said region based on the spatial domain analysis of the data representation thereof.

13. The apparatus of claim 11, wherein the modified quantizer comprises:

a thresholder that receives the transform coefficients from the transform module and obtains thresholded coefficients by thresholding the transform coefficients based on the first quantization table; and a quantization module that receives the thresholded coefficients from the thresholder and produces said quantized coefficients by quantizing the thresholded coefficients based on the fine quantization table.

14. The apparatus of claim 13, wherein the fine quantization table is optimized for quantizing text images.

15. The apparatus of claim 13, wherein the segmenter characterizes the image type of said region based on the spatial domain analysis of the data representation thereof.

16. The apparatus of claim 15, wherein the fine quantization table is optimized for quantizing text images.

* * * * *